(12) United States Patent
Jones et al.

(10) Patent No.: US 7,803,743 B2
(45) Date of Patent: Sep. 28, 2010

(54) INVERT EMULSION CARRIER FLUID AND OIL-WETTING AGENT AND METHOD OF USING SAME

(75) Inventors: Thomas A. Jones, Cypress, TX (US); Alexander J. McKellar, The Woodlands, TX (US); Lirio Quintero, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 453 days.

(21) Appl. No.: 11/444,878

(22) Filed: Jun. 1, 2006

(65) Prior Publication Data

US 2006/0272815 A1 Dec. 7, 2006

Related U.S. Application Data

(60) Provisional application No. 60/687,670, filed on Jun. 6, 2005.

(51) Int. Cl.
C09K 8/68 (2006.01)
C09K 8/64 (2006.01)
C09K 8/584 (2006.01)
C23G 1/06 (2006.01)
E21B 43/04 (2006.01)

(52) U.S. Cl. .................. 507/203; 166/278; 507/265; 507/259; 507/266; 507/925

(58) Field of Classification Search .................. 507/90, 507/203, 265, 259, 266, 925; 166/278
See application file for complete search history.

(56) References Cited

U.S. PATENT DOCUMENTS

| 4,199,720 | A | | 4/1980 | McNeill |
| 4,306,980 | A | * | 12/1981 | Brandt et al. ............... 507/103 |
| 4,436,636 | A | * | 3/1984 | Carnicom .................... 507/118 |
| 4,436,739 | A | | 3/1984 | Krumkalns |
| 4,482,712 | A | | 11/1984 | Krumkalns |
| 4,553,879 | A | | 11/1985 | Langner |
| 4,575,428 | A | * | 3/1986 | Clapper et al. ............... 507/131 |
| 4,579,668 | A | | 4/1986 | Messenger |
| 4,900,456 | A | | 2/1990 | Ogilvy |
| 5,062,969 | A | | 11/1991 | Holtmyer et al. |
| 5,186,817 | A | | 2/1993 | Paspek et al. |
| 5,242,899 | A | | 9/1993 | Binon |
| 5,277,519 | A | | 1/1994 | Nahm |
| 5,333,698 | A | | 8/1994 | Van Slyke |
| 5,472,937 | A | * | 12/1995 | Fleming et al. .............. 507/140 |
| 5,635,457 | A | | 6/1997 | Van Slyke |
| 5,653,886 | A | | 8/1997 | Kerr et al. |
| 5,700,395 | A | | 12/1997 | Thetford et al. |
| 5,709,827 | A | | 1/1998 | Andersen et al. |
| 5,710,111 | A | | 1/1998 | Van Slyke |
| 5,803,666 | A | | 9/1998 | Keller |
| 5,853,049 | A | | 12/1998 | Keller |
| 5,861,362 | A | | 1/1999 | Mayeux et al. |
| 5,942,468 | A | * | 8/1999 | Dobson et al. ............... 507/136 |
| 5,958,845 | A | | 9/1999 | Van Slyke |
| 6,034,037 | A | | 3/2000 | Van Slyke |
| 6,096,690 | A | | 8/2000 | Wittenbrink et al. |
| 6,107,255 | A | | 8/2000 | Van Slyke |
| 6,110,874 | A | | 8/2000 | Van Slyke |
| 6,133,351 | A | | 10/2000 | Hayner |
| 6,156,708 | A | | 12/2000 | Brookey et al. |
| 6,159,907 | A | | 12/2000 | Van Slyke |
| 6,194,355 | B1 | | 2/2001 | Jarrett et al. |
| 6,197,877 | B1 | | 3/2001 | Thetford et al. |
| 6,255,256 | B1 | | 7/2001 | Van Slyke |
| 6,339,048 | B1 | * | 1/2002 | Santhanam et al. ......... 507/131 |
| 6,455,474 | B1 | | 9/2002 | Wittenbrink et al. |
| 6,485,651 | B1 | | 11/2002 | Branning |
| 6,509,409 | B1 | | 1/2003 | Thetford |
| 6,534,449 | B1 | | 3/2003 | Gilmour et al. |
| 6,562,764 | B1 | | 5/2003 | Donaldson et al. |
| 6,562,897 | B1 | | 5/2003 | Thetford |
| 6,569,814 | B1 | | 5/2003 | Brady et al. |
| 6,583,213 | B1 | | 6/2003 | Fawkes et al. |
| 6,599,947 | B2 | | 7/2003 | Thetford |

(Continued)

FOREIGN PATENT DOCUMENTS

| GB | 2 376 254 A | 12/2002 |
| WO | WO 97/34963 | 9/1997 |
| WO | WO 01/59256 A1 | 8/2001 |
| WO | WO-2006-133008 A3 | 12/2006 |

OTHER PUBLICATIONS

Kelker, S., et al., "Development of an Oil-Based Gravel-Pack Carrier Fluid," Society of Petroleum Engineers, SPE-64978, 2001, pp. 1-8, SPE International Symposium Feb. 2001.

(Continued)

*Primary Examiner*—Timothy J. Kugel
*Assistant Examiner*—Atnaf Admasu
(74) *Attorney, Agent, or Firm*—Paula D. Morris; The Norris Law Firm, P.C.

(57) ABSTRACT

A gravel packing fluid and method for gravel packing a wellbore using a gravel packing fluid comprising an invert emulsion comprising oil as an external phase, clear brine as an internal phase, and a quantity of emulsifier effective to produce a stable invert emulsion, the external phase of the gravel packing fluid further comprising gravel wetting agent.

51 Claims, 15 Drawing Sheets

U.S. PATENT DOCUMENTS

| | | | |
|---|---|---|---|
| 6,620,769 | B1 | 9/2003 | Juppe et al. |
| 6,631,764 | B2 | 10/2003 | Parlar et al. |
| 7,008,907 | B2 * | 3/2006 | Kirsner et al. ............. 507/137 |
| 7,067,460 | B2 * | 6/2006 | Summerhill et al. ........ 507/103 |
| 2001/0036905 | A1 | 11/2001 | Parlar et al. |
| 2002/0033258 | A1 | 3/2002 | Patel |
| 2002/0155956 | A1 | 10/2002 | Chamberlain et al. |
| 2003/0045605 | A1 | 3/2003 | Thompson |
| 2004/0097380 | A1 | 5/2004 | Summerhill et al. |
| 2006/0073987 | A1 * | 4/2006 | Mueller et al. ............. 507/136 |

OTHER PUBLICATIONS

Donaldson, A., et al., "Invert Gravel Pack Carrier Fluid," Society of Petroleum Engineers, SPE-71669, 2001, pp. 1-14, SPE Annual Technical Conference Oct. 2001.

Penberthy, Jr., W. L., et al., "Gravel Placement in Horizontal Wells," Society of Petroleum Engineers, SPE-31147, 1996, pp. 1-11, SPE Asia Pacific Oil and Gas Conference Oct. 2000.

Penberthy, Jr., W.L., et al., "Gravel Pack Placement," Sand Control, SPE Series on Special Topics vol. 1, Henry L. Doherty Series, 1992, Chapter 8, pp. 45-57.

USPTO PCT/US ISA/US; Notification of Transmittal of the International Search Report and the Written Opinion of the International Searching Authority, or the Declaration; International Application No. PCT/US06/21552; mailed Sep. 11, 2007 [4 pgs].

USPTO PCT/US ISA/US; Written Opinion of the International Searching Authority; International Application No. PCT/US06/21552; mailed Sep. 11, 2007 [5 pgs].

* cited by examiner

|  | Test 1<br>IGPF 9.75 ppq, 14 cps<br>2.5 BPM 0.5 ppa 20/40 Sand | | | Test 2<br>IGPF 9.75 ppq, 15.5 cps<br>3.5 BPM 1.5 ppa 20/40 Sand | | | Test 3<br>Water, 8.345 ppq, 1 cps<br>3.5 BPM 1.5 ppa 20/40 Sand | | |
|---|---|---|---|---|---|---|---|---|---|
|  | Measured | Etimated Base Pipe ID 3.548" ID Roughness=0.01" | Etimated Efective SID 3.735" ID Roughness=0.06" | Measured | Etimated Base Pipe ID 3.548" ID Roughness=0.01" | Etimated Efective SID 3.735" ID Roughness=0.06" | Measured | Etimated Base Pipe ID 3.548" ID Roughness=0.01" | Etimated Efective SID 3.735" ID Roughness=0.03" |
| Dune/Hole Ratio | 0.64 | 0.625 | 0.725 | 0.56 | 0.52 | 0.568 | 0.79 | 0.703 | 0.757 |
| Alpha Pressure, psi | 65 | 42 | 72 | 135 | 80 | 134 | 85 | 63 | 91 |
| Beta Pressure, psi | 155 | 150 | 147 | 270 | 285 | 279 | 200<br>(180 psi @ 3.3 bpm) | 210 | 172 |

INVERT EMULSION CARRIER FLUID AND OIL-WETTING AGENT AND METHOD OF USING SAME

PRIORITY

The present application claims the benefit of the filing date of U.S. Provisional Application Ser. No. 60/687,670 filed Jun. 6, 2005.

FIELD OF THE APPLICATION

The application relates to invert emulsion fluids which are particularly suited to gravel packing and workover of wells drilled in subterranean hydrocarbon-bearing formations, including without limitation deviated, horizontal, and/or directional wells, and to methods of gravel packing using the invert emulsion fluids.

BACKGROUND

The completion of deviated wellbores in oil and gas reservoirs with an aqueous gravel pack fluid, such as halide brine, is a successful sand control practice. Some wellbore applications, however, are not technical candidates for brine transported gravel because water-sensitive shale can become destabilized via hydration and interfere with gravel placement. Gravel packs with "invert emulsion" carrier fluids, or water-in-oil emulsion fluids, have been suggested because the external phase of invert emulsion fluids prevents shale hydration effects, thereby preventing destabilization.

Unfortunately, attempts to gravel pack with invert emulsion systems have formed gravel packs that were relatively loose and unpredictable after the gravel pack operation with respect to their ability to control formation sand after the gravel pack fully settled in the wellbore.

SUMMARY OF THE INVENTION

The present application provides an invert emulsion gravel packing fluid.

The application provides a gravel packing fluid comprising an invert emulsion comprising oil as an external phase, clear brine as an internal phase, and a quantity of emulsifier effective to produce a stable invert emulsion, the external phase of the gravel packing fluid further comprising gravel wetting agent.

The present application also provides a method for gravel packing a wellbore using an invert emulsion gravel packing fluid.

The application also provides a method for gravel packing a wellbore comprising:
providing a stable invert emulsion comprising oil as an external phase, clear brine as an internal phase, and emulsifier in an amount sufficient to produce a stable emulsion;
after producing the stable emulsion, providing the stable emulsion with gravel wetting agent, thereby producing a modified emulsion; and,
injecting the modified emulsion into a wellbore with gravel under conditions effective to produce an effective, tight gravel pack.

The application also provides a method for gravel packing a wellbore comprising:
providing a stable invert emulsion comprising oil as an external phase, clear brine as an internal phase, and emulsifier in an amount sufficient to produce a stable emulsion;
after producing the stable emulsion, injecting the stable emulsion into a wellbore together with an amount of gravel and gravel wetting agent sufficient to render the gravel oil-wet and to produce an effective, tight gravel pack.

BRIEF DESCRIPTION OF THE FIGURES

FIG. 5 displays the measured data and estimated data from Examples 1-4 using both base pipe ID and effective screen ID as screen ID, using the non-centralized screen option.

DETAILED DESCRIPTION

Figure 1:
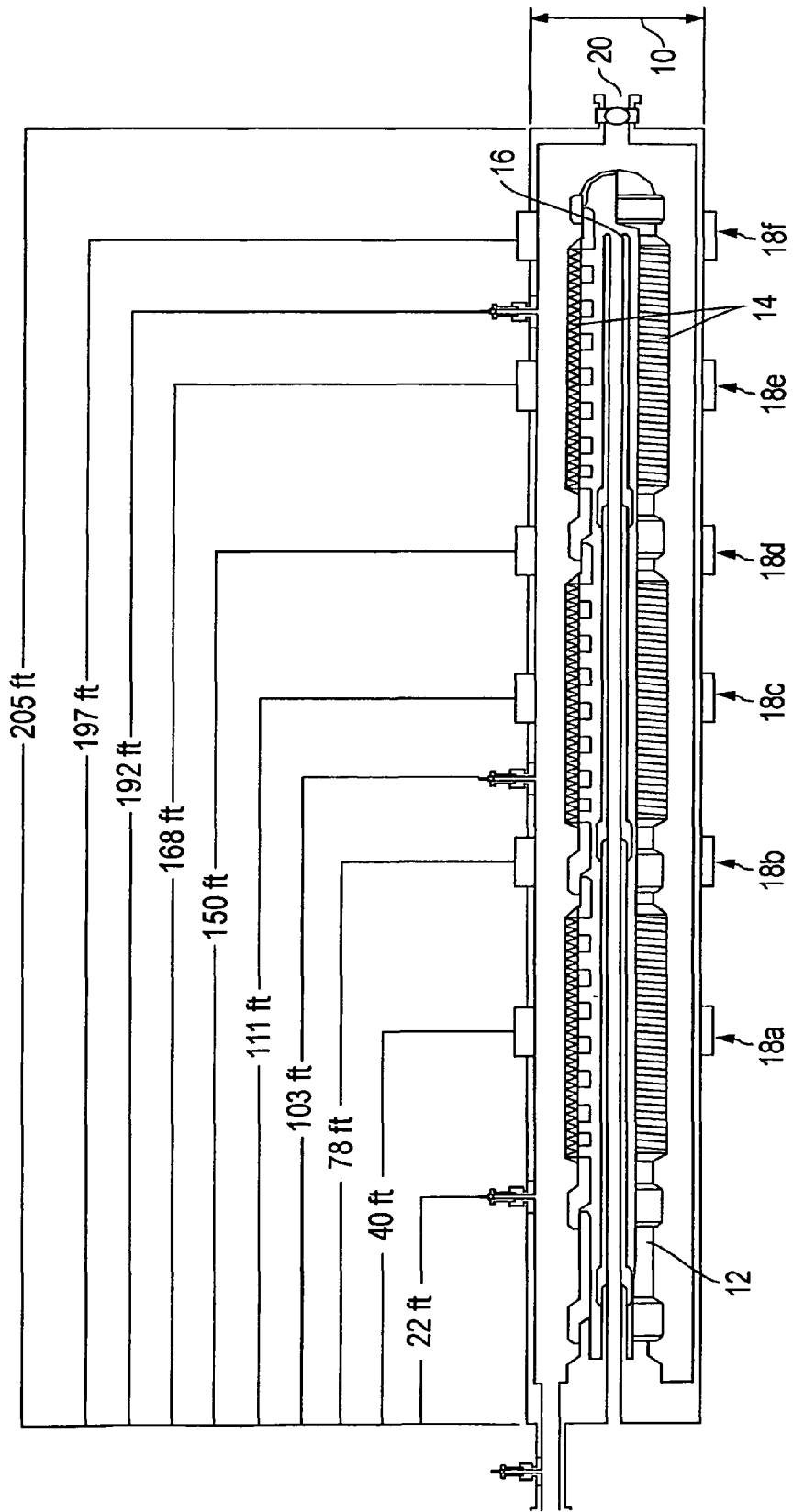
FIG. 1 illustrates the testing setup in the Baker Oil Tools Horizontal Gravel Pack Simulator located at the Baker Hughes Technology Center in Houston Tex.

Although the invert emulsion fluid described herein is particularly suited for use as a gravel packing fluid, the fluid also may be useful for sand control, for other workover operations, as a displacement fluid, as a spacer fluid, and/or as a fluid for drilling and/or drill-in operations (herein collectively referred to as "well servicing fluids").

The phrase "solids-free" means that no solid materials (particulates, such as weighting agents or commercial particulates) other than drill cuttings are present in the well-servicing fluid.

The term "horizontal" with respect to a wellbore or drilling refers to an angle other than 90 degrees relative to the wellbore surface, viewing the surface as a plane at ground level.

The term "gravel" refers to natural gravel and other proppant type materials, natural and man made or synthetic. Examples of suitable proppants include, but are not necessarily limited to sand, pebbles, bauxite, and synthetic beads.

Examples of synthetic beads include but are not necessarily limited to ceramic beads and resin coated beads.

As used herein, a "tight" gravel pack is a gravel pack comparable to that produced using water or a brine, such as a sodium chloride or calcium chloride, as a carrier fluid. Compared to most oil-based carrier fluids, water and brine carrier fluids produce more grain-to-grain contact and less void space between grains in the gravel pack.

To extract hydrocarbons such as natural gas and crude oil from a subterranean formation, boreholes are drilled into hydrocarbon bearing production zones. Numerous systems have been employed to maintain the productivity of a borehole, to control the flow of hydrocarbon fluids from the borehole, while allowing only limited reservoir sand production and preventing natural forces from collapsing and obstructing or terminating fluid flow from the borehole.

One system provides a full depth casement of the wellbore, where the wellbore wall is lined with a steel casing pipe that is secured to the bore wall by an annulus of concrete between the outside surface of the casing pipe and the wellbore wall. The steel casing pipe and surrounding concrete annulus is thereafter perforated along the production zone to allow hydrocarbon fluids to flow from the producing formation into the casing pipe interior. Usually, the casing pipe interior is sealed above and below the producing zone, and a smaller diameter "production pipe" penetrates the upper seal to provide the hydrocarbon fluids a smooth and clean flowing conduit to the surface.

An increasingly popular well completion system protects the wellbore wall production integrity by a tightly packed deposit of aggregate comprising sand, gravel or both between the raw borehole wall and the production pipe. This type of system avoids the time and expense of setting a steel casing from the surface to the production zone, which may be many thousands of feet below the surface. The gravel packing is inherently permeable to the hydrocarbon fluid product from the zone and structurally reinforces the borehole wall against interior collapse or flow degradation. This type of well completion system is called an "open hole" completion.

The apparatus and process for depositing gravel between the borehole wall and the production pipe is an "open hole gravel pack system." Open hole gravel pack systems usually include one or more sand control screens between the packed gravel annulus and a hydrocarbon production pipe. In addition to the common meaning of the term, the word "screen" also refers to slotted or perforated pipe. If the production zone is not at the bottom terminus of the well, the wellbore is closed by a packer at the distal or bottom end of the production zone to provide bottom end support for the gravel pack volume. The upper end of the production zone volume is delineated by a packer around the annulus between the wellbore and the pipe column, called a "completion string," that carries hydrocarbon produced to the surface. This upper end packer may also be positioned between the completion string and the inside surface of the well casing at a point substantially above the screens and the production zone.

The packers and other "downhole" well conditioning equipment are placed using a surface controlled column of pipe that is often called a "tool string." A surface controlled mechanism within the tool string selectively directs a fluidized slurry flow of sand and/or gravel from within the internal pipe bore of the tool string into the lower annulus between the raw wall of the wellbore and the outer perimeter of the completion string. This mechanism is positioned along the well depth proximate of the upper packer. As the tool string directs descending slurry flow from the tool string bore into the wellbore annulus, the tool string also directs the rising flow of slurry filtrate that has passed through screens in a production pipe extended below the upper packer. This rising flow of slurry filtrate is directed from the production pipe bore into the wellbore annulus above the upper packer.

Open hole gravel pack systems have provided successful sand control when completing deviated wellbores in oil and gas reservoirs with an aqueous gravel pack fluid or carrier fluid, such as a halide or formate brine. Some wellbore applications, however, are not technical candidates for brine transported gravel because water-sensitive shale can become destabilized via hydration, fall into the open hole wellbore, and interfere with gravel placement. Gravel packs with invert emulsion carrier fluids have been suggested because the external phase of invert emulsion fluids prevents destabilization by preventing shale hydration effects.

Attempts to gravel pack with solids-free invert emulsion systems have not been completely successful. Gravel settling from the external oil medium apparently occurs at a slow rate, resulting in a loose pack. Invert emulsion gravel packing fluids and methods of using invert emulsion gravel packing fluids which produce a tighter pack are needed.

The present application provides a stable invert emulsion comprising an external phase comprising oil-wetting agent effective to alter the wettability of gravel carried by the invert emulsion fluid from water-wet to oil-wet and to improve the rheological profile of the fluid. The oil-wetting agent facilitates a faster settling rate during the "alpha wave" of an "alpha-beta" gravel packing procedure in a horizontal wellbore, allows "gravel dune height" to be controlled as needed in order to achieve an "alpha-beta" gravel pack, and improves the tightness (intergranular packing) of the gravel during both the "alpha" and "beta" wave deposition sequences. The specialized oil-wetting surfactant gives a similar benefit (tighter pack) in viscous invert emulsion fluid gravel pack carrier fluid methods.

"Alpha-Beta" Gravel Packing, Generally

"Alpha-beta" gravel-packing typically uses a brine carrier fluid that contains low concentrations of gravel. A relatively high annular flow rate, approximately 92.44 m/min (300 ft/min) is used to transport gravel through the workstring and cross-over tool. After exiting the cross-over tool, the brine-gravel slurry enters the relatively large wellbore/screen annulus, and the gravel settles on the bottom of the horizontal wellbore, forming a dune.

As the height of the settled bed increases, the cross-sectional flow area is reduced, increasing the velocity across the top of the dune. The velocity continues to increase as the bed height grows until the minimum velocity needed to transport gravel across the top of the dune is attained. At this point, no additional gravel is deposited and the bed height is said to be at equilibrium. This equilibrium bed height will be maintained as long as slurry injection rate and slurry properties remain unchanged. Changes in surface injection rate, slurry concentration, brine density, or brine viscosity will establish a new equilibrium height.

Incoming gravel is transported across the top of the equilibrium bed, eventually reaching the region of reduced velocity at the leading edge of the advancing dune. In this manner, the deposition process continues to form an equilibrium bed that advances as a wave front (the "alpha wave") along the wellbore in the direction of the toe. When the alpha wave reaches the end of the wash pipe, it ceases to grow, and gravel being transported along the completion begins to back-fill the area above the equilibrium bed. As this process continues, a new wave front (the "beta" wave) returns to the heel of the completion. During deposition of the beta wave, dehydration of the pack occurs mainly through fluid loss to the screen/wash pipe annulus.

The development of bridges in long perforated intervals or highly deviated wells can end the treatment prematurely, resulting in reduced production from unpacked perforations, voids in the annular gravel pack, and/or reduced fracture width and conductivity.

The Invert Emulsion Gravel Packing Fluid

The present application provides an invert emulsion gravel packing fluid which is particularly effective using the "alpha-beta" gravel pack technique to achieve a gravel pack having tightness comparable to that produced using water or brine. The external (oil) phase of a stable invert emulsion carrier fluid is provided with an oil-wetting surfactant to create a fluid environment with properties sufficient to transport gravel from heel-to-toe in an open-hole wellbore completion application. The wellbore may be deviated from vertical to horizontal, such that the gravel quickly settles and self-packs during the alpha/beta packing process to control reservoir sand production during the life of the well.

The invert emulsion gravel packing fluid maintains shale stability before and during the gravel packing operation. The invert emulsion gravel pack fluid comprises oil as an external phase and clear brine as an internal phase and has the following properties; a density of from about 0.84 g/cc (7 lb/gal) to 1.56 g/cc (13.0 lb/gal); substantially Newtonian rheological properties at temperatures of from about 4.44° C. (40° F.) to about 121.11° C. (250° F.), as determined under pressure using a FANN 75 rheometer; a viscosity of about 20 cP or less at 300 rpm, more preferably about 10 cP at 300 rpm; and, remains stable under static conditions at 121.11° C. (250° F.) for two weeks or more.

The External Phase

Suitable oils for the external phase of the invert emulsion fluid are oils that are compatible with the invert emulsion fluid used to drill the wellbore and which have the desired viscosity characteristics. Preferred oils are n-paraffins, mineral oils, olefins, or other oils with a kinematic viscosity at 40° C. of about 3.5 or less, preferably 2 or less, more preferably less than 2.

The Clear Brine

Clear brines having a density substantially the same as water or more (about 1.0 g/cc [8.34 lb/gal] or more) generally produce invert emulsion fluids having a density sufficient to provide a hydrostatic pressure greater than the formation pressure and to carry gravel without the need for addition of other materials or solids. In a preferred embodiment, the clear brine has a density of from about 1.0 g/cc (8.34 lb/gal) to about 2.3 g/cc (19.2 lb/gal).

The clear brine comprises substantially any salt capable of providing sufficient density. Preferred salts include, but are not necessarily limited to halide salts and formate salts. Suitable salts comprise metals including, but not necessarily limited to metals selected from the group consisting of sodium, calcium, zinc, potassium, cesium, and combinations thereof. Most preferred clear brines comprise salts selected from the group consisting of calcium chloride, calcium bromide, zinc/calcium bromide, potassium formate, cesium/potassium formate, and combinations thereof.

Where the brine comprises a halide salt, the brine suitability comprises from about 1 lb of sodium or potassium chloride salt or less per barrel of water to about 2.3 g/cc (19.2 lb/gal) of liquid stock ZnBr2/CaBr2/CaCl2, preferably the brine densities range from about 1.2 g/cc (10 lb/gal) to about 1.8 g/cc (15 lb/gal) of blended halide salt solution. Where the brine is a formate salt, the brine suitability comprises of about 1.55 g/cc (12.9 lb/gal) liquid stock potassium formate only or a blend of 1.55 g/cc (12.9 lb/gal) potassium formate blended with 2.29 g/cc (19.1 lb/gal) of liquid stock cesium to produce a final maximum brine density of about 2.28 g/cc (19.0 lb/gal) or less.

Various quantities of oil and brine may be used, so long as an invert (brine water-in-oil) emulsion is created and the rheology of the fluid is suitable for the intended use. For gravel packing, invert emulsions produced using brines having a density of 1.39 g/cc (11.6 lb/gal) or less preferably have an oil to brine ratio of 45/55 or more. Where the brine has a density of greater than 1.39 g/cc (11.6 lb/gal), typically calcium bromide and zinc bromide, the oil to brine ratio preferably is 50/50 or more.

The type of brine used depends on the desired density of the invert emulsion fluid. Each brine type can be used to formulate fluids whose densities range from the density of the base oil to a maximum allowable value depending on the oil/brine ratio and the choice of base oil. Use of higher density base oil allows for a higher range of allowable fluid densities for each brine type. The upper density limits can be determined by calculating a weighted density average between the oil and brine phases determined by the oil to brine ratio. The true crystallization temperature (TCT) of brine composing the internal phase intended for deep-water usage preferably is below −1.11° C. (30° F.).

The Emulsifier

The emulsion is rendered stable with a suitable emulsifier. Suitable emulsifiers generally are more soluble in water, having an HLB of from 3 to 8, preferably 3 to 6. Suitable emulsifiers generally comprise nitrogen and include, but are not necessarily limited to amides and imidazolines, including but not necessarily limited to polyolefin amides, alkeneamides, and imidazolines. A most preferred emulsifier comprises imidazoline. A most preferred commercially available imidazoline is CARBO-MUL™, which is commercially available from Baker Hughes Drilling Fluids.

The amount of emulsifier is sufficient to form a stable emulsion. A stable emulsion generally is produced using from about 1.43 kg/m$^3$ (0.5 gal/bbl) to about 5.7 kg/m$^3$ (2.0 gal/bbl) of emulsifier, based on the volume of invert emulsion to be produced. The emulsifier typically comprises from about 50 to about 70 wt. %, preferably about 60 wt. %, active ingredient in a suitable base. A suitable base includes, but is not necessarily limited to mineral oil, and may include a stabilizer, such as alcohol.

Wetting Agent

The invert emulsion fluid also comprises a quantity of wetting agent sufficient to render the gravel oil wet.

It has been discovered that merely mixing an emulsifier with the oil (external phase) and brine during preparation of a stable invert emulsion does not produce a fluid that is effective to change the wettability of the gravel to oil wet. As a result, the invert emulsion produces a relatively loose gravel pack. In order to ensure that wetting agent is present in the external phase of the invert emulsion and available to change the wettability of the gravel to oil wet, the wetting agent is added after a stable invert emulsion is formed. The quantity of wetting agent added to the stable invert emulsion fluid is at least effective to render an initial "load" of gravel to be packed oil-wet. Additional wetting agent preferably is injected into the circulating invert gravel pack carrier fluid ("IGPCF") along with additional gravel in an amount effective to render the additional gravel oil wet.

The active ingredients in suitable wetting agents are relatively strong oil wetting agents which are not water soluble. Suitable wetting agents have an HLB of about 4 or less, preferably 3 or less. Examples of strong active ingredients for the wetting agent include but are not necessarily limited to dodecyl benzene sulfonate, calcium salts of fatty acids, glycerol triesters, sorbitan esters, lecithin, fatty alcohols, and combinations thereof. Preferred wetting agent active ingredients are polyolefin amide alkene amines. A preferred, commercially available polyolefin amide alkene amine is BIO-COTE™ which is commercially available from Baker Hughes Drilling Fluids.

The wetting agent also comprises oil base which is soluble in the external phase of the invert emulsion. Suitable oil bases for the wetting agent include, but are not necessarily limited to n-paraffins, mineral oil, olefins, and combinations thereof. In a preferred embodiment, where the active ingredient is polyolefin amide alkene amine, the oil base is olefin.

A sufficient amount of wetting agent is added to the stable invert emulsion to provide a concentration of about 2.9 liters/$m^3$ (1/8 gal/bbl) or more active ingredient in the invert emulsion fluid. Where the wetting agent is BIO-COTE™, from about 5.9 liters/$m^3$ (0.25 gal/bbl) to about 23.8 liters/$m^3$ (1.0 gal/bbl) or more BIO-COTE™ is added to the stable emulsion, based on the volume of the stable emulsion. In a most preferred embodiment, the stable emulsion is delivered to the rig-site and, after gravel pack preparations are complete, from about 5.9 liters/$m^3$ (0.25 gal/bbl) to about 23.8 liters/$m^3$ (1.0 gal/bbl) BIO-COTE™ is added to the stable invert emulsion to produce the invert emulsion gravel packing fluid, which is then circulated downhole to establish the required annular flow rate to gravel pack the wellbore. Suitable annular flow rates generally are about 92.44 n/min (300 ft/min) or more, preferably about 92.44 m/min (300 ft/min).

In a preferred embodiment, additional gravel is substantially continuously infused into the wellbore along with additional wetting agent, preferably polyolefin amide alkene amine solution, most preferably BIO-COTE™. In a preferred embodiment, the amount of wetting agent infused into the circulating fluid causes the fluid to achieve and maintain approaching Newtonian rheological behavior. This generally requires substantially continuously infusing about 5.95 liters/$m^3$ wetting agent or more, or 0.25 gallons of wetting agent per barrel or more, of invert emulsion gravel pack fluid during gravel packing operations.

"Viscous IGPCF" refer to IGPCF which are formulated with viscosifying agents with the intent to achieve non-Newtonian rheology. Unlike solids-free near Newtonian IGPCF's (described above), viscous IGPCF's have a slow rate of gravel settling and packing due to incomplete or partial oil wetting of the gravel particles. Thus, the gravel settling rate of a viscous fluid can be improved by formulating a stable emulsion and adding oil-wetting agent. The settling rate will not be affected as dramatically as in near Newtonian carrier fluids; however, the settling rate and tightness of the final pack can be substantially improved by adding oil-wetting agent to the stable emulsion.

In a preferred embodiment for producing the stable invert emulsion, about 0.4 to about 0.7 barrels of oil (external phase), preferably n-paraffin, is mixed with from about 11.89 liters/$m^3$ (0.5 gal/bbl) to about 47.55 liters/$m^3$ (2.0 gal/bbl) CARBO-MUL (based on the volume of stable invert emulsion produced), to produce an oil/emulsifier mixture. The amount of oil (external phase) varies inversely with the density of the oil. From about 4.755 liters/$m^3$ (0.2 gal/bbl) to about 14.26 liters/$m^3$ (0.6 gal/bbl) brine is mixed with the oil/emulsifier mixture, based on the total volume of the oil/emulsifier mixture, producing a stable invert emulsion. At this juncture in the mixing process, a stable invert emulsion is formed. Thereafter, from about 5.9 liters/$m^3$ (0.25 gal/bbl) to about 23.8 liters/$m^3$ (1.0 gal/bbl) wetting agent is added, preferably BIO-COTE™, based on the total volume of the stable invert emulsion.

The invert emulsion fluids will contact drilling mud or drilling fluid used in the well and the oil(s) used to produce the emulsion preferably are compatible with the oil or synthetic in the drilling mud. Best results are obtained when the emulsions are used in gravel packing where the gravel is being continuously deposited during the packing operation.

The application will be better understood with reference to the examples, which are illustrative only and should not be construed as limiting.

Mixing Procedure

In order to prepare an IGPCF for laboratory scale testing, the following guidelines were used. One lab barrel of fluid at a time was prepared using a multimixer. The required products (base oil, emulsifier, wetting agent, brine, etc.) were measured into a mixing cup and the mixing cup was placed on the mixer and stirred. The emulsifier was added and a stopwatch was started to measure mixing time. After one minute, the brine was slowly added. Once all of the brine was introduced into the oil/emulsifier mixture, the wetting agent was added and the resulting mixture was mixed for 60 minutes. After mixing, the IGPCF was tested to determine its rheological properties using a FANN 35 viscometer and to determine electrical stability using an electrical stability meter.

Static Testing

In order to evaluate the thermal stability over extended periods of time, a sample of fluid was placed in a stainless steel aging cell in a Teflon liner and pressurized with nitrogen to a pressure appropriate for the temperature of interest. The cell was then placed in an oven at the chosen temperature for the desired amount of time. After removing the cell from the oven and allowing it to cool, the free oil was removed from the top of the sample and measured. The remaining fluid was then poured carefully from the liner until approximately one inch of fluid remained. Using an electrical stability (ES) probe, the ES was measured for the bottom layer of fluid to discern the presence of free brine. An abnormally low ES measurement at the bottom of the liner was a reliable indicator that brine breakout had occurred.

Testing Facility

The simulations described in certain of the following examples were carried out in the Baker Oil Tools Horizontal Gravel Pack Simulator located at the Baker Hughes Technology Center in Houston Tex. The apparatus can be configured for lengths up to 182.9 meters (600 ft). For the purpose of the simulations, a simulator length of approximately 60.96 meters (200 ft) was used. FIG. 1 illustrates the actual testing setup.

Horizontal Gravel Pack Simulator Capabilities

Pressure—Working pressure of 4809 kPa (700 psi), maximum pressure limit of 10,306 kPa (1500 psi)

Pumps (not shown.)—350 hhp triplex, 0.78 m³/m (6.5 bpm) max. rate, 68,707 kPa (10,000 psi) max. pressure Gravel Infuser (not shown)—Standard 4" Infuser, 272.16 kg/min (600 lb/min) maximum sand feed rate.

Complete data acquisition capabilities (not shown)

G.P. Simulator Dimensions

Main Wellbore (10)—16.83 cm (6⅝ in), 384.44 kg/m³ (24 lb/ft³) casing, 15.04 cm (5.921 in) ID Blank (12)—4.22 m (10 ft) of 10.16 cm (4 in), 152.18 kg/m³ (9.5 lb/ft³), 9.01 cm (3.548 in) ID Screen (14)—54.864 m (180 ft) of 10.16 cm (4 in) BWS [11.3 cm (4.45 in OD), 9.01 cm (3.548 in) ID]

Wash pipe (16)—7.30 cm (2.875 in) OD, 6.2 cm (2.441 in) ID

Observation windows (18a-18f)—20.32 cm (8 in) OD, 15.24 cm (6 in) ID

Test Procedure

1. IGPCF at 1.18 g/cc (9.8 lb/gal) was prepared and circulated through a choke (not shown) to heat the fluid to 48.89° C. (120° F.).
2. The test apparatus was filled with IGPCF fluid and circulated through a choke (not shown) to heat the fluid to 48.89° C. (120° F.) before starting the gravel pack simulation test. The fluid properties were obtained.
3. The Baker Hughes Data Acquisition System was calibrated and the pop-off valve on the pump was set to 4,826 kPa (700 psi).
4. Fluid was circulated at test rate taking returns through the wash pipe 16.
5. 20/40 gravel was infused and the gravel slurry was circulated at the test rate.
6. The packing mechanism was observed and the dune height marked at each window (18a-18f).
7. Fluid properties were obtained immediately after the gravel pack simulation test.

IGPCF having the following composition and properties was used in a series of tests in Examples 1-3:

| | Invert Gravel Pack Carrier Fluid | | | |
|---|---|---|---|---|
| | Sample No. | | | |
| | 1 | | 2 | |
| LVT-200*, m³ | 0.4866 | | 0.4866 | |
| CARBO-MUL, kg/m³ | 17.1 | | 17.1 | |
| EXP-178, kg/m³ | 5.7 | | 5.7 | |
| 14.2 lb/gal CaBr2 Brine, m³ | 0.3793 | | 0.3793 | |
| Water, m³ | 0.1095 | | 0.1095 | |
| Oil/Brine Ratio | 51.2/48.8 | | 51.2/48.8 | |
| Oil/Water Ratio | 55.4/44.6 | | 55.4/44.6 | |
| Expected Density, g/cc | 1.18 | | 1.18 | |
| Measured Density, g/cc | 1.17 | | 1.17 | |
| Initial Properties @ 48.89° C. (120° F.) | | | | |
| Temperature | 21.11° C. | 48.89° C. | 21.11° C. | 48.89° C. |
| | (70° F.) | (120° F.) | (70° F.) | (120° F.) |
| 600-rpm | 54 | 28 | 55 | 28 |
| 300-rpm | 27 | 14 | 27.5 | 14 |
| 200-rpm | 18 | 9 | 18 | 9 |
| 100-rpm | 9 | 4.5 | 9 | 4.5 |
| 6-rpm | 0.5 | 0 | 0.5 | 0 |
| 3-rpm | 0 | 0 | 0 | 0 |
| 10-sec gel, lb/100 sq ft | 0.5 | 0 | 0.5 | 0 |
| 10-min gel, lb/100 sq ft | 0.5 | 0 | 0.5 | 0 |
| Plastic Viscosity, cP | 27 | 14 | 27.5 | 14 |
| Yield Point, lb/100 sq ft | 0 | 0 | 0 | 0 |
| Electrical stability, volts | 340 | 330 | 350 | 330 |

*LVT-200 is a mineral oil, commercially available from Conoco Phillips.

**EXP-178 is a polyolefin amide alkene amine, commercially available from Baker Hughes Drilling Fluids.

Sample # 1 was taken immediately before the simulation was run. Fluid properties are consistent with those measured previously. Sample #2 was taken immediately after the pumps were shut down after the pack was performed. These properties were identical to those of #1

The simulation procedures outlined above were followed for the IGPCF (Fluid 1 in the foregoing Table) at 0.397 m³/min (2.5 bbl/min) and 0.06 g/cc (0.5 lb/gal added). Distinct alpha wave and beta wave were observed. With no fluid loss, a constant dune height was expected (See FIGS. 1b and 1c, discussed below). However, observed dune height in window #5 was much higher than the dune height at previous windows. A complete pack to the wash pipe bottom was achieved. The pack seemed to be looser than the pack performed with water as a carrier fluid (See Example 3). The data recorded during the testing was taken both through electronic data acquisition and manually. Dune heights were measured by marking the equilibrium height on both sides of each window. Table 3 shows the results of these measurements.

TABLE 3

Measured Dune/Hole Ratio of Test 1
IGPCF, 0.397 m³/min (2.5 bbl/min and 0.06 g/cc (0.5 lb/gal added),
100% fluid return

| Window | Height of Model (m/in) | Height to Top of Dune (in/m) | | | Dune Height (cm/in) | Dune/Hole Ratio |
|---|---|---|---|---|---|---|
| | | From | Back | Average | | |
| 1 | 0.914/36 | 1.041/41 | 1.041/41 | 1.046/41.18 | 10.617/4.18 | 0.70 |
| 2 | 0.864/34 | 0.965/38 | 0.99/39 | 0.994/39.12 | 10.16/4.00 | 0.67 |
| 3 | 0.864/34 | 0.99/39 | 0.965/38 | 0.989/38.93 | 9.677/3.81 | 0.64 |
| 4 | 0.864/34 | 1.016/40 | 0.965/38 | 0.998/39.31 | 9.677/3.81 | 0.64 |
| 5 | 0.864/34 | 1.041/41 | 1.041/41 | 0.057/41.62 | 15.545/6.12 | |

Figure 1A:
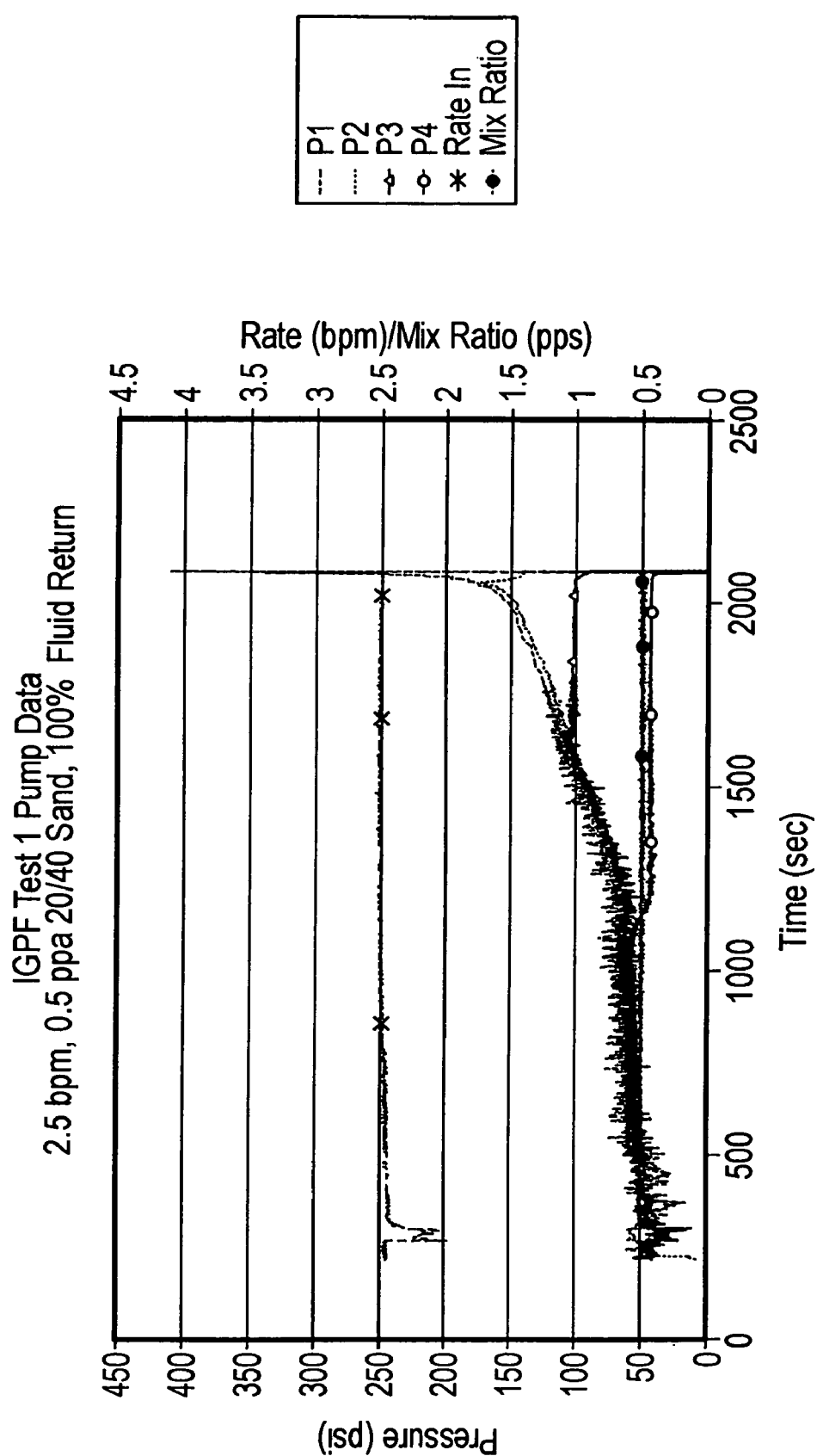
FIG. 1a illustrates the pressure, rate, and gravel mix ratio data for Example 1.

The electronic data acquisition included the following:
1) Elapsed Time
2) Transducer 1 Pressure
3) Transducer 2 Pressure
4) Transducer 3 Pressure
5) Transducer 4 Pressure
6) Rate in, bpm
7) Return Rate, bpm
8) Sand Rate, lb/min
9) Mix ratio, ppa
10) Total Sand, lbs
11) Total slurry, bbls FIG. 1a illustrates the pressure, rate, and gravel mix ratio data for Example 1.

The expected pressure and dune/hole ratio were estimated using the ID of the base pipe or blank (12, in FIG. 1) as screen ID and pipe roughness of 0.0254 cm (0.01 in.) The following were the assumptions:
Centralized: False
Fluid Return Ratio=1
Max. Hole Angle, deg=90
Hole Diameter=15.24 cm (6 in)
Screen O.D.=11.43 cm (4.5 in)
Wash Pipe OD=7.3 cm (2.875 in)
Pipe Roughness=0.0254 cm (0.01 in)
Fluid Vis., cP=14
Fluid Dens.=1.17 g/cc (9.75 ppg)
Mix Ratio, lb/gal added (or ppa)=0.06 g/cc (0.5 lb/gal added)
Gravel Dia.=0.0635 cm (0025 in)

Figure 1B:
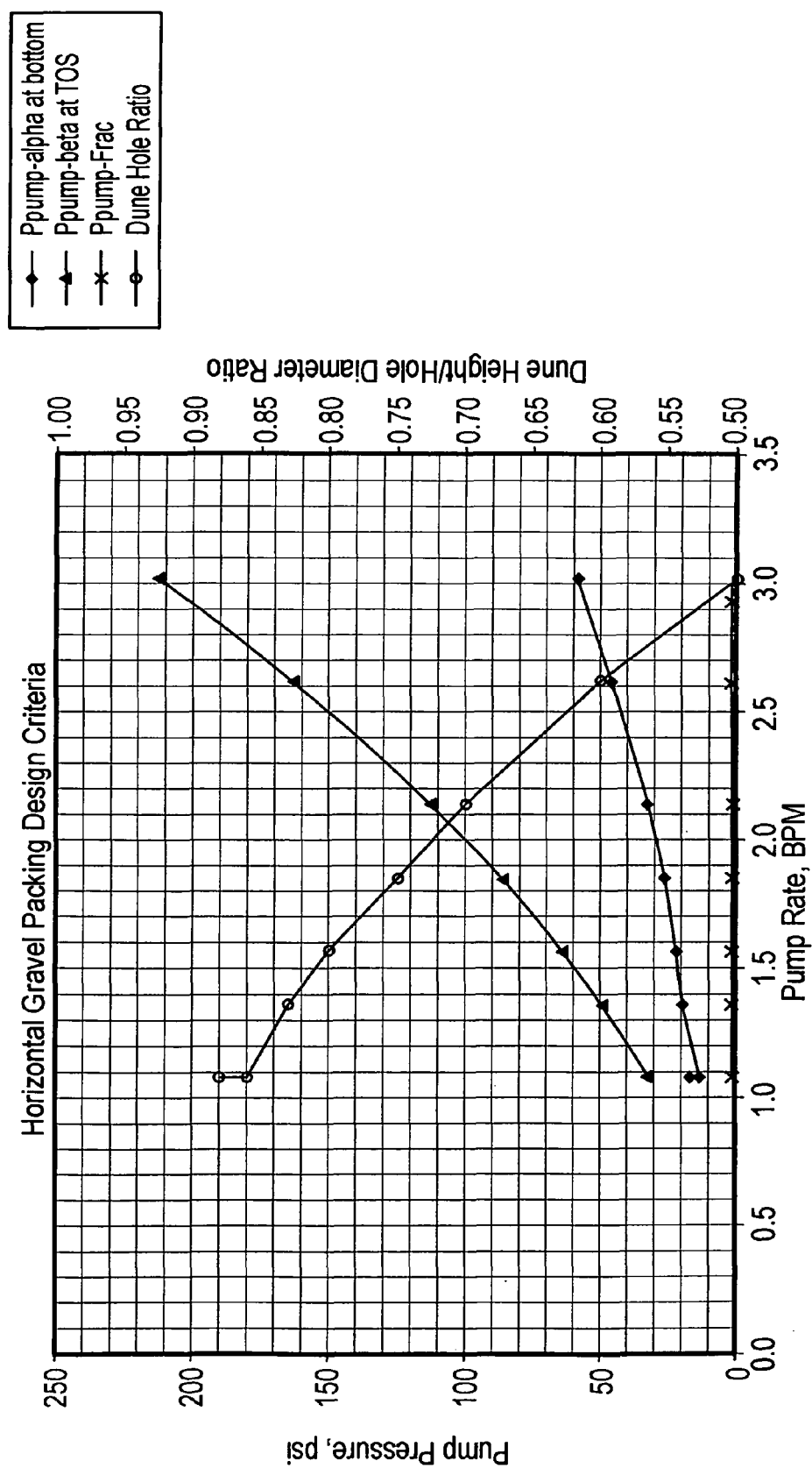
FIG. 1b illustrates the estimated Pressure and Dune/Hole ratio as a function of Rate for the horizontal gravel pack of Example 1.

FIG. 1b shows the estimated Pressure and Dune/Hole ratio as a function of Rate for horizontal gravel pack test 1. At 0.397 m³/min (2.5 bbl/min), the estimated dune hole ratio was about 0.625, and the inlet pressure was about 289.58 kPa (42 psi) at the end of the alpha wave and 1,034 kPa (150 psi) when the beta wave reached the top of the screen.

The pressure and dune/hole ratio also were estimated based on the following assumptions:
Centralized: False
Fluid Return Ratio=1
Max. Hole Angle, deg=90
Hole Diameter=15.24 cm (6 in)
Screen O.D.=11.43 cm (4.5 in), 9.49 cm (3.735 in)
Wash Pipe OD=7.3 cm (2.875 in)
Pipe Roughness=0.1524 cm (0.06 in)
Fluid Vis., cP=14
Fluid Dens.=1.17 g/cc (9.75 ppg)
Mix Ratio=0.06 g/cc (0.5 lb/gal added or ppa)
Gravel Dia.=0.0635 cm (0.025 in)

Figure 1C:
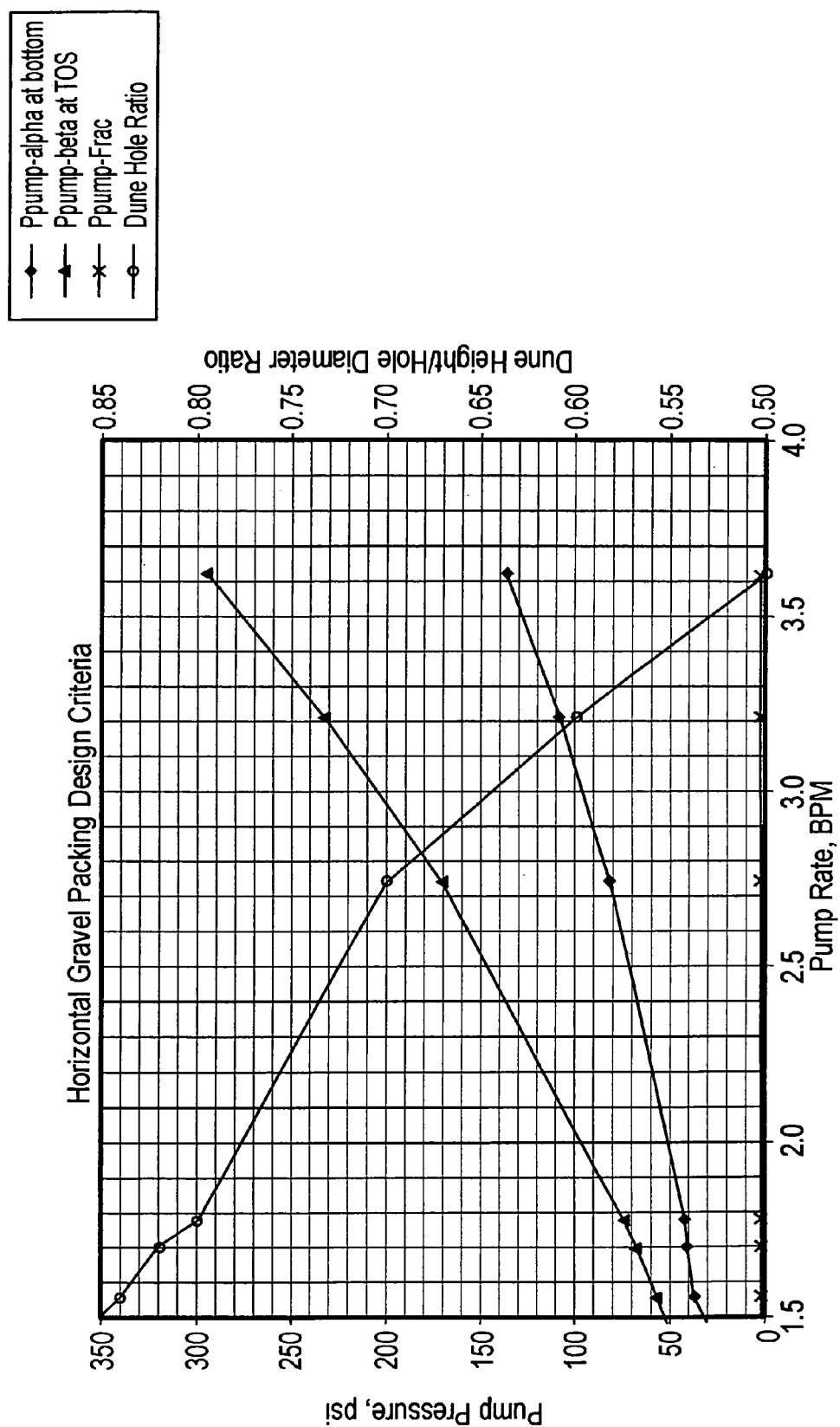
FIG. 1c shows the estimated Pressure and Dune/Hole ratio as a function of Rate for the horizontal gravel pack of Example 1.

FIG. 1c shows the estimated Pressure and Dune/Hole ratio as a function of Rate for horizontal gravel pack test 1. At 0.397 m³/rain (2.5 bbl/min), the estimated dune hole ratio was about 0.725, and the inlet pressure was about 496.4 kPa (72 psi) at the end of the alpha wave and 147 psi when the beta wave reached the top of the screen using apparent pipe roughness of 0.1524 cm (0.06 in).

Example 2
Test 2
IGPCF, 0.556 m³/min (3.5 bbl/min), 0.18 g/cc (1.5 lb/gal Added), 100% Fluid Return The procedures above were followed using IGPCF (Fluid 2, from Example 1) at 0.556 m³/min (3.5 bbl/min) and 0.18 g/cc (1.5 lb/gal added). Distinct alpha wave and beta waves were observed. At this test rate and mix ratio, lower dune height than dune height in Example 1 was observed in the first three windows, as expected. However, observed dune height in window #4 was much higher than the dune height at previous windows. The pack was stalled above window #6. There was void in window #3 and the pack Was not as tight as with water carrier fluid (See Example 3).

Figure 2A:
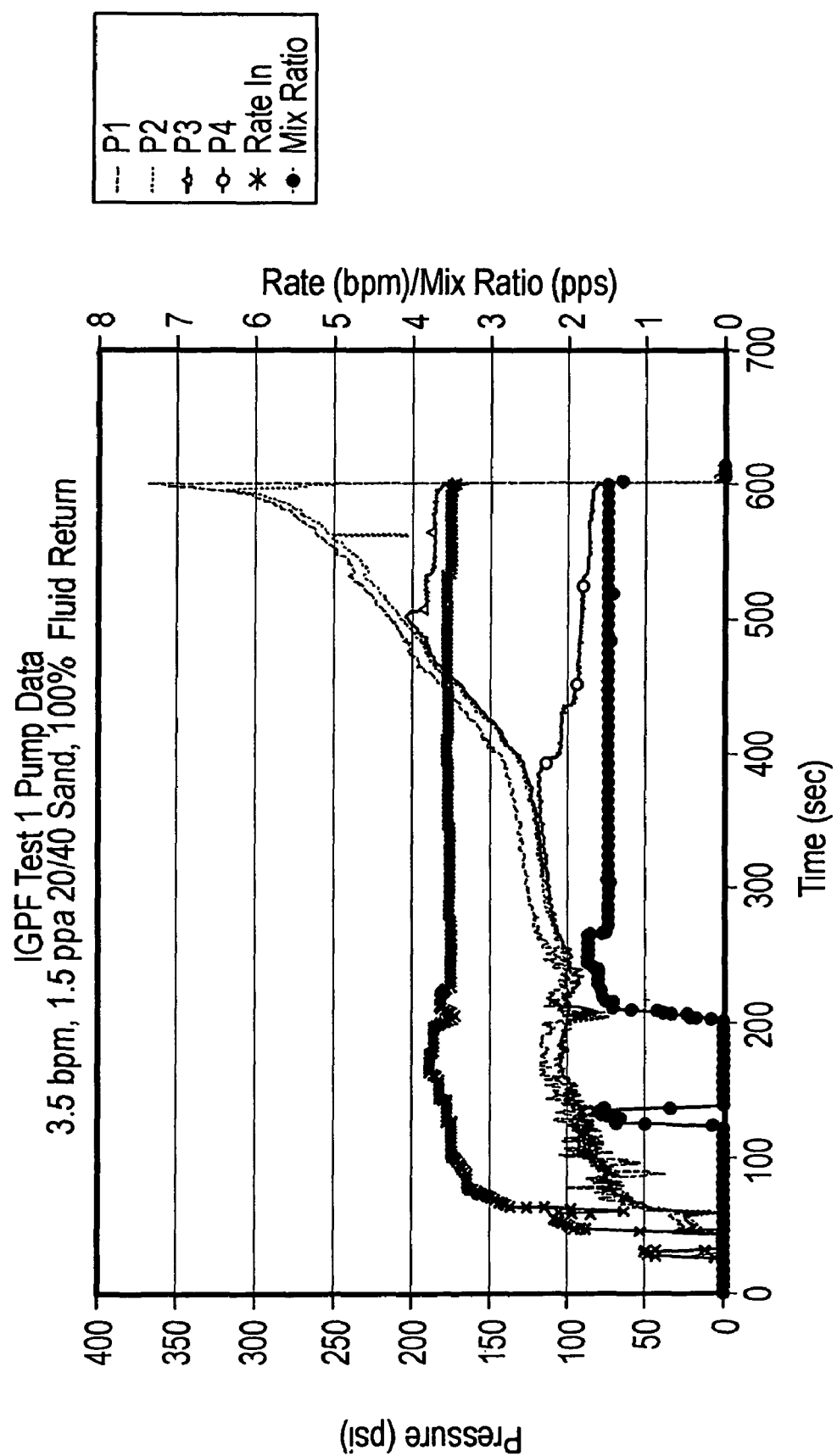
FIG. 2a illustrates the pressure, rate, and gravel mix ratio data for Example 2.

FIG. 2a illustrates the pressure, rate, and gravel mix ratio data for Example 2.

The expected pressure and dune/hole ratio were estimated using base pipe ID and pipe roughness of 0.0254 cm (0.01 in). The data recorded during the testing was taken both through electronic data acquisition and manually. Dune heights were measured by marking the equilibrium height on both sides of each window. Table 4 shows the results of these measurements.

TABLE 4

Measured Dune/Hole Ratio of Test 2
IGPCF, 0.556 m³/min (3.5 bbl/min) and 0.216 g/cc (1.5 lb/gal added), 100% fluid return

| Window | Height of Model (m/in) | Height to Top of Dune (m/in) | | | Dune Height (cm/in) | Dune/Hole Ratio |
|---|---|---|---|---|---|---|
| | | From | Back | Average | | |
| 1 | 0.914/36 | 1.016/40 | 1.0414/41 | 1.035/40.75 | 9.525/3.75 | 0.63 |
| 2 | 0.864/34 | 0.965/38 | 0.965/38 | 0.978/38.50 | 8.56/3.37 | 0.56 |
| 3 | 0.864/34 | 0.965/38 | 0.965/38 | 0.978/38.50 | 8.56/3.37 | 0.56 |
| 4 | 0.864/34 | 1.016/40 | 1.016/40 | 1.038/40.87 | 16.64/5.37 | 0.90 |
| 5 | 0.864/34 | NM | NM | | | |

The following were the assumptions where the estimated pipe roughness was 0.01 in:
Centralized: False
Fluid Return Ratio=1
Max. Hole Angle, deg=90
Hole Diameter=15.24 cm (6 in)
Screen O.D.=11.45 cm (4.5 in)
Wash Pipe OD=7.3 cm (2.875 in)
Pipe Roughness=0.0254 cm (0.01 in)
Fluid Vis., cP=15.5
Fluid Dens.=1.17 g/cc (9.75 ppg)
Mix Ratio=0.18 g/cc (1.5 lb/gal added or ppa)
Gravel Dia.=0.0635 cm (0.025 in)

Figure 2B:
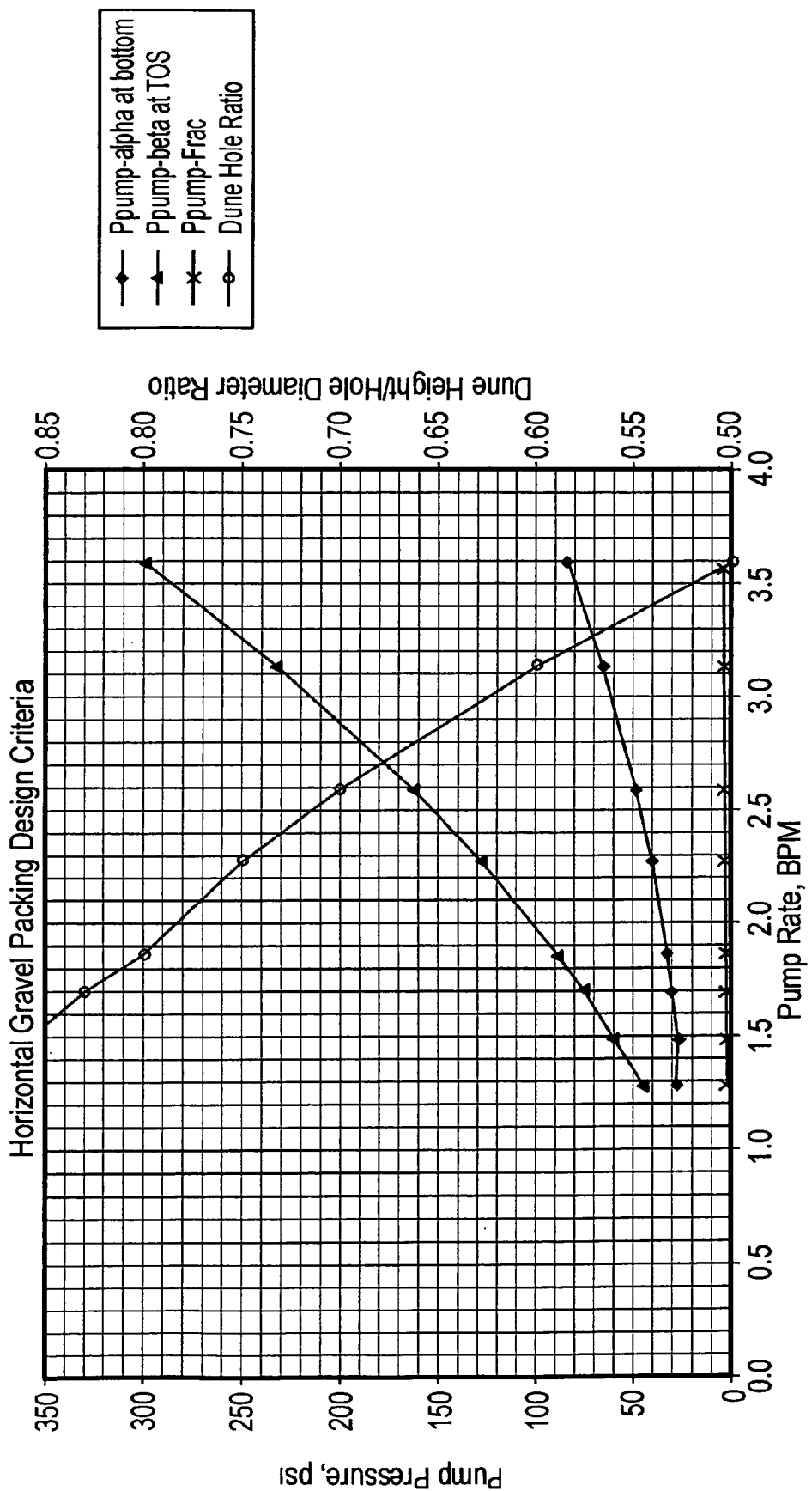
FIG. 2b shows the estimated Pressure and Dune/Hole ratio as a function of Rate for the horizontal gravel pack of Example 2.

FIG. 2b shows the estimated Pressure and Dune/Hole ratio as a function of Rate for horizontal gravel pack test 2. At 0.556 m³/min (3.5 bbl/min), the estimated dune hole ratio was about 0.52, and the inlet pressure was about 552 kPa (80 psi) at the end of the alpha wave and 1,965 kPa (285 psi) when the beta wave reached the top of the screen.

Figure 2C:
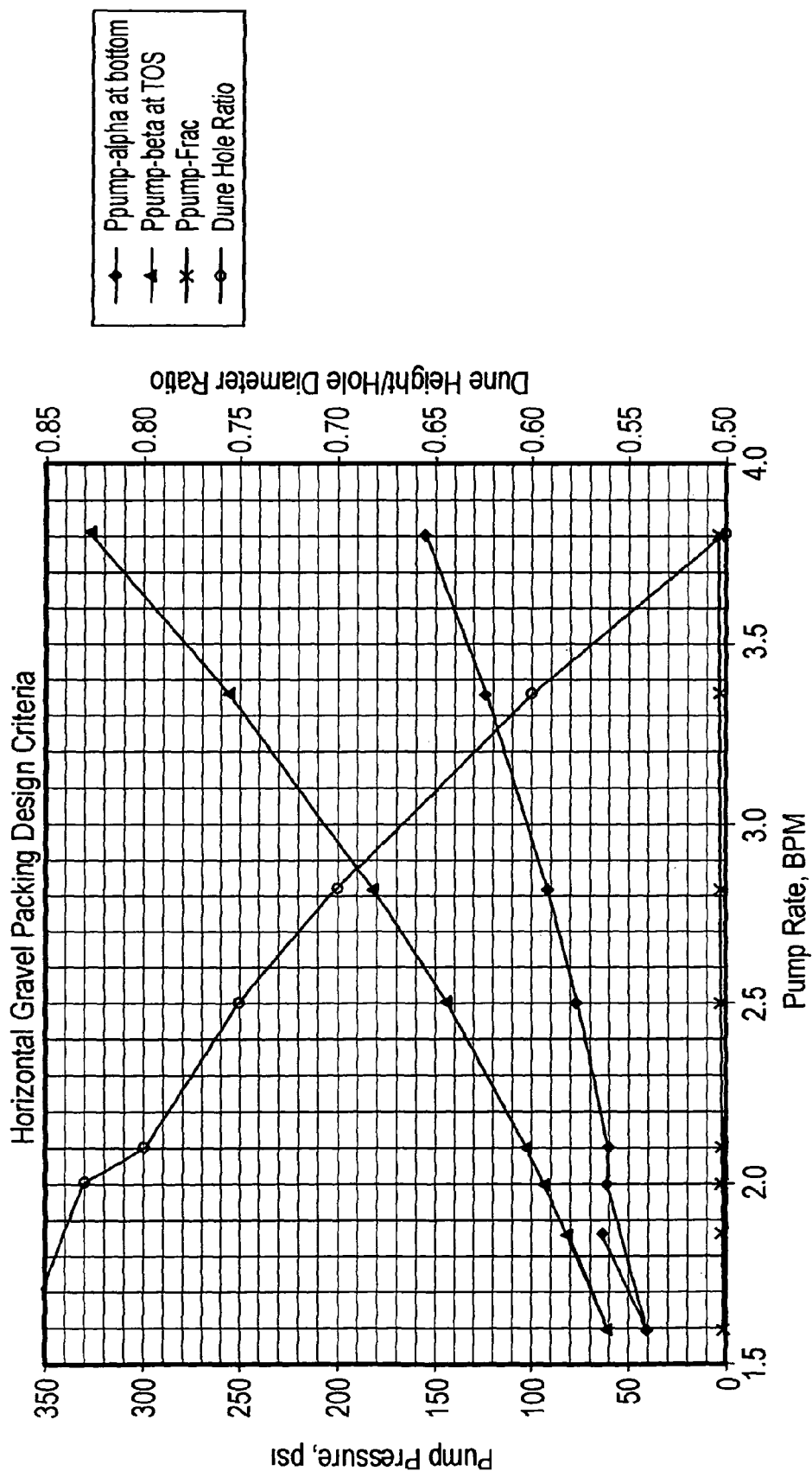
FIG. 2c shows the estimated Pressure and Dune/Hole ratio as a function of Rate for the horizontal gravel pack of Example 2 using apparent pipe roughness of 0.06."

FIG. 2c shows the estimated Pressure and Dune/Hole ratio as a function of Rate for horizontal gravel pack test 2 using apparent pipe roughness of 0.1524 cm (0.06"). The following were the assumptions:
Centralized: False
Fluid Return Ratio=1
Max. Hole Angle, deg=90
Hole Diameter=15.24 cm (6 in)
Screen O.D.=11.43 cm (4.5 in), 9.49 cm (3.735 in)
Wash Pipe OD=7.3 cm (2.875 in)
Pipe Roughness=0.1524 cm (0.06 in)
Fluid Vis., cP=15.5
Fluid Dens.=1.17 g/cc (9.75 ppg)
Mix Ratio=0.18 g/cc (1.5 lb/gal added or ppa)
Gravel Dia.=0.0635 cm (0.025 in)

At 0.556 m³/min (3.5 bbl/min), the estimated dune hole ratio was about 0.568, and the inlet pressure was about 1,034 kPa (134 psi) at the end of the alpha wave and 1,924 kPa (279 psi) when the beta wave reached the top of the screen using apparent pipe roughness of 0.1524 cm (0.06").

Example 3

Test 3

Water, 0.556 m/min (3.5 bbl/min) and 0.18 g/cc (1.5 lb/gal Added), 100% Fluid Return The test was repeated using water at 0.556 m³/min (3.5 bbl/min) and 0.18 g/cc (1.5 lb/gal added). Distinct alpha wave and beta waves were observed. Similar dune heights were observed at all windows. A complete tight pack was achieved.

Table 5

Measured Dune/Hole Ratio of Test 3

TABLE 5

Measured Dune/Hole Ratio of Test 3
Water, 0.556 m³/min (3.5 bbl/min) and 0.216 g/cc (1.5 lb/gal added), 100% fluid return

| Window | Height of Model (m/in) | Height to Top of Dune (m/in) | | | Dune (cm/in) Height | Dune/Hole Ratio |
|---|---|---|---|---|---|---|
| | | From | Back | Average | | |
| 1 | 0.914/36 | 1.041/41 | 1.041/41 | 1.013/39.87 | 1.77/4.50 | 0.63 |
| 2 | 0.864/34 | 0.99/39 | 1.016/40 | 1.011/39.81 | 1.87/4.75 | 0.56 |
| 3 | 0.864/34 | 0.99/39 | 0.99/39 | 1.022/40.25 | 1.84/4.68 | 0.56 |
| 4 | 0.864/34 | 1.016/40 | 1.016/40 | 1.022/40.25 | 1.87/4.75 | 0.90 |
| 5 | 0.864/34 | NM | NM | | 1.87/4.75 | |

Figure 3A:
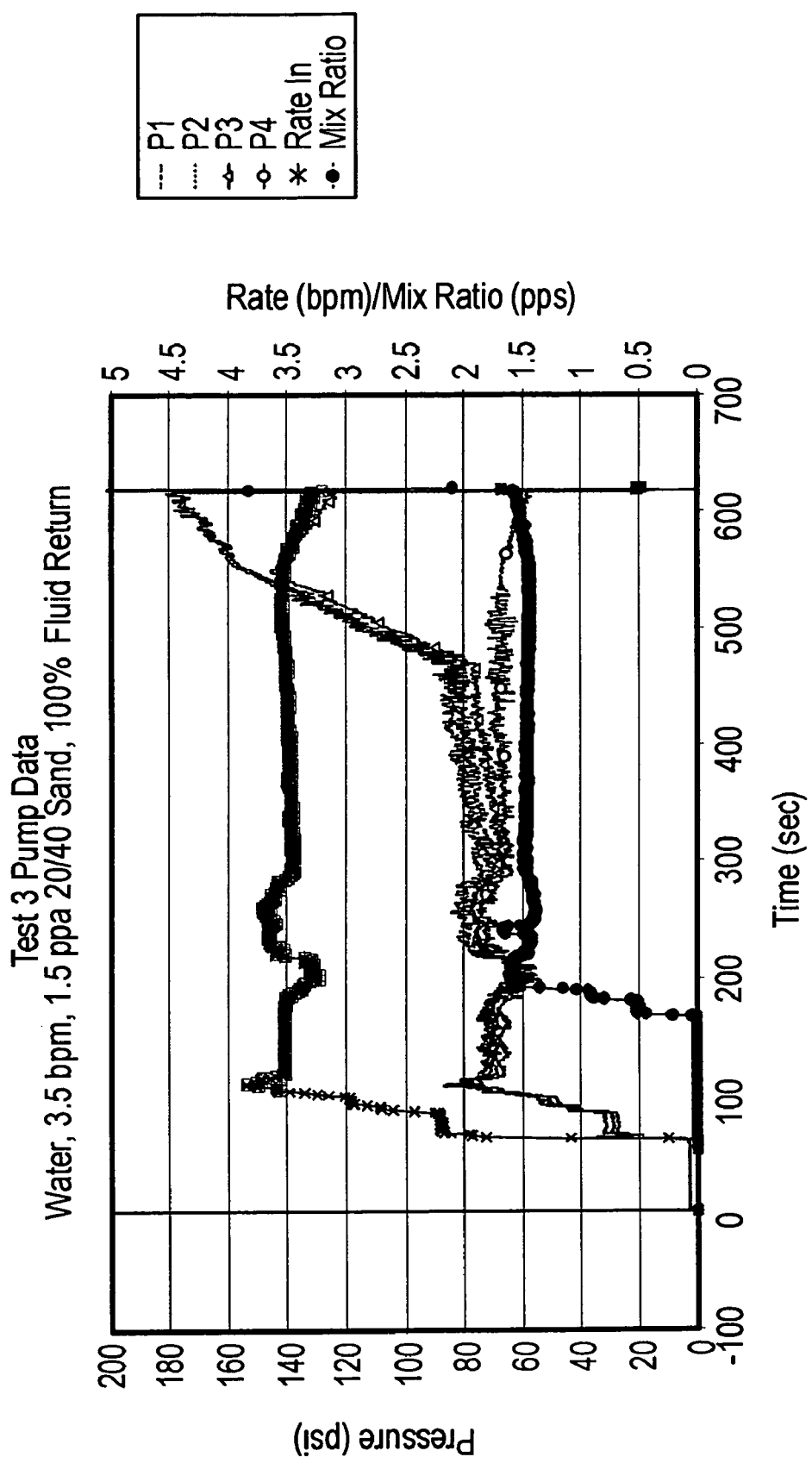
FIG. 3a illustrates the pressure, rate, and gravel mix ratio data for Example 3.

FIG. 3a illustrates the pressure, rate, and gravel mix ratio data for Example 3.

The pressure and dune/hole ratio were estimated using base pipe ID as screen ID and pipe roughness of 0.1524 cm (0.06 in). The following were the assumptions:
  Centralized: False
  Fluid Return Ratio=1
  Max. Hole Angle, deg=90
  Hole Diameter=15.24 cm (6 in)
  Screen O.D.=11.43 cm (4.5 in), 9.49 cm (3.735 in)
  Wash Pipe OD=7.3 cm (2.875 in)
  Pipe Roughness=0.1524 cm (0.06 in)
  Fluid Vis., cP=14
  Fluid Dens.=1.17 g/cc (9.75 ppg)
  Mix Ratio=0.18 g/cc (1.5 lb/gal added)
  Gravel Dia.=0.0635 cm (0.025 in)

Figure 3B:
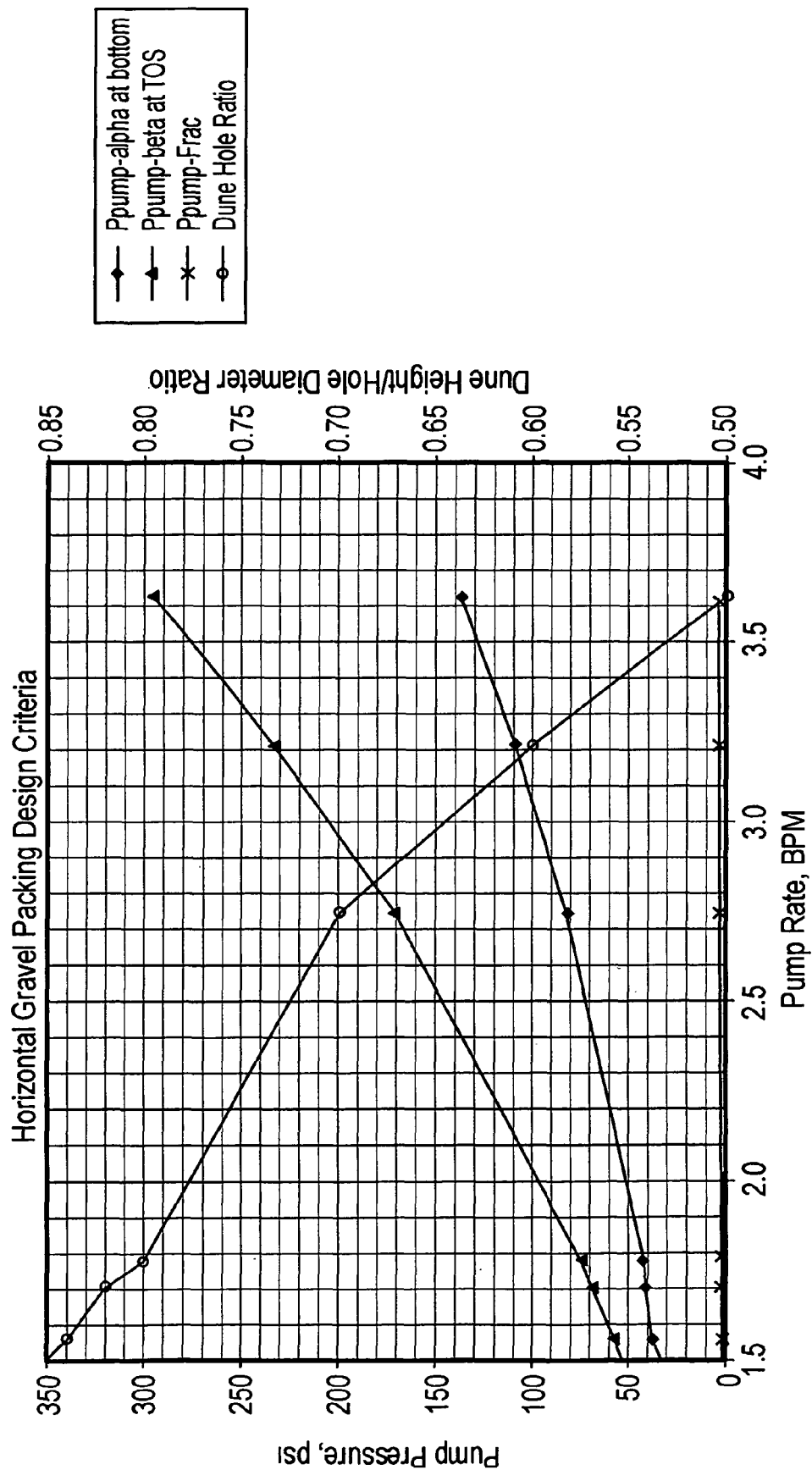
FIG. 3b shows the estimated Pressure and Dune/Hole ratio as a function of Rate for horizontal gravel pack with water in Example 3.

FIG. 3b shows the estimated Pressure and Dune/Hole ratio as a function of Rate for horizontal gravel pack with water in Example 3. At 0.556 m$^3$/min (3.5 bbl/min), the estimated dune hole ratio was about 0.703, and the inlet pressure was about 434 kPa (63 psi) at end of alpha wave and 1,448 kPa (210 psi) when beta wave reach top of the screen.

Figure 3C:
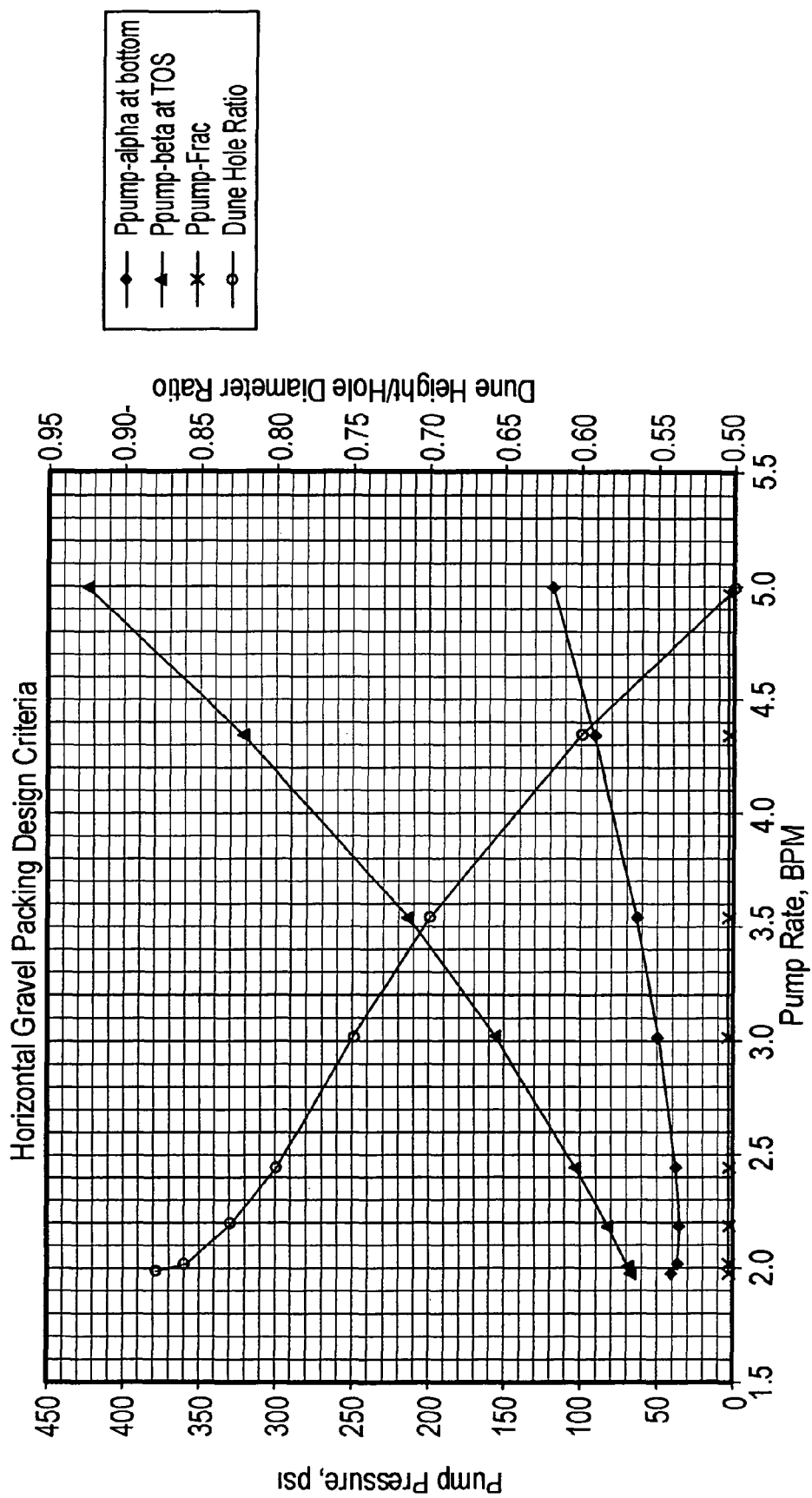
FIG. 3c shows the estimated Pressure and Dune/Hole ratio as a function of Rate for the horizontal gravel pack with water in Example 3.

FIG. 3c shows the estimated Pressure and Dune/Hole ratio as a function of Rate for horizontal gravel pack with water in test 3. The following were the assumptions:
  Centralized: False
  Fluid Return Ratio=1
  Max. Hole. Angle, deg=90
  Hole Diameter=15.24 cm (6 in), 9.49 cm (3.735 in)
  Screen O.D.=11.43 cm (4.5 in)
  Wash Pipe OD=7.3 cm (2.875 in)
  Pipe Roughness=0.0254 cm (0.01 in)
  Fluid Vis., cP=1
  Fluid Dens.=1 g/cc (8.345 ppg)
  Mix Ratio=0.18 g/cc (1.5 lb/gal added)
  Gravel Dia.=0.0635 cm (0.025 in)

At 0.556 m$^3$/min (3.5 bbl/min), the estimated dune/hole ratio was about 0.757, and the inlet pressure was about 627 kPa (91 psi) at the end of the alpha wave and 1,186 kPa (172 psi) when the beta wave reached the top of the screen using apparent pipe roughness of 0.0762 cm (0.03").

Based on Examples 1-3, the IGPCF fluid behaved like high viscosity brine. Distinct alpha wave and beta wave were observed in both Example 1 and Example 2. The sand pack performed with IGPCF fluid was not as tight as the pack performed with water as a carrier fluid.

As expected, stabilized dune height in Example 2 was lower than the stabilized dune height in Example 1. The sudden increase in dune height above the stabilized dune in both tests performed with IGPCF fluid may imply obstruction or screen plugged in the GP simulator. Test performed with water as a carrier fluid at 0.556 m$^3$/min (3.5 bbl/min) and 0.216 g/cc (1.5 lb/gal added) 20/40 sand, and 100% fluid return yielded similar dune height at all windows that was higher than the stabilized dune height formed with IGPCF fluid. Using effective screen ID as screen ID instead of base pipe ID resulted in closer agreement between measured data and estimated data but apparent pipe roughness to match both alpha pressure and beta pressure was much higher than the typical value of 0.01524 cm (0.006 in)-0.0254 cm (0.01 in) [about 0.1524 cm (0.06 in) in both test 1 and test 2, and 0.0762 cm (0.03 in) in test 3)].

When using base pipe ID as screen ID, the measured stabilized dune heights were higher than the estimated values: 2.4% higher in test 1 and 7.7% higher in test 2. When using effective screen ID as screen ID, the measured dune heights were lower than the estimated values: 11.7% lower in test 1 and 1.4% lower in test 2. When using base pipe ID as screen ID, and pipe roughness of 0.0254 cm (0.01 in), the measured beta pressures were within 5% of the estimated values. The measured alpha pressures were much higher than the estimated values in both tests, 55% higher in test 1 and 69% higher in test 2. This may indicate severe screen plugging at the bottom. When using effective screen ID as screen ID, and pipe roughness of 0.0254 cm (0.06 in), the measured beta pressures were within 5% of the estimated value. The measured alpha pressure was about 10% lower than the estimated value in test 1, and was about 1% higher than the estimated value in test 2.

Example 4

To be sure that observed results were due to obstruction or plugged screen in the GP simulator, a comparison test with water as a carrier fluid using the same test apparatus was recommended. A test was performed with water as a carrier fluid with pumping parameter similar to Example 2: 0.556 m$^3$/min (3.5 bbl/min) and 0.216 g/cc (1.5 lb/gal added), 20/40 sand, and 100% fluid return provided the following results: measured stabilized dune/hole ratio of about 0.79 was observed in all windows, and alpha pressure was about 593 kPa (86 psi) and beta pressure was about 1,248 kPa (180 psi) [rate drop down to 0.525 m$^3$/min (3.3 bbl/min)].

The following assumptions were made in estimating dune/hole ratio:
  Centralized: False
  Fluid Return Ratio=1
  Max. Hole Angle, deg=90
  Hole Diameter=15.24 cm (6 in)
  Screen O.D.=11.43 cm (4.5 in), 9.49 cm (3.735 in)
  Wash Pipe OD=7.3 cm (2.875 in)
  Pipe Roughness=0.0762 cm (0.03 in)
  Fluid Vis., cP=1
  Fluid Dens., g/cc=1 g/cc (8.345 ppg)
  Mix Ratio=0.18 g/cc (1.5 lb/gal added)
  Gravel Dia.=0.0635 cm (0.025 in)

Figure 4:
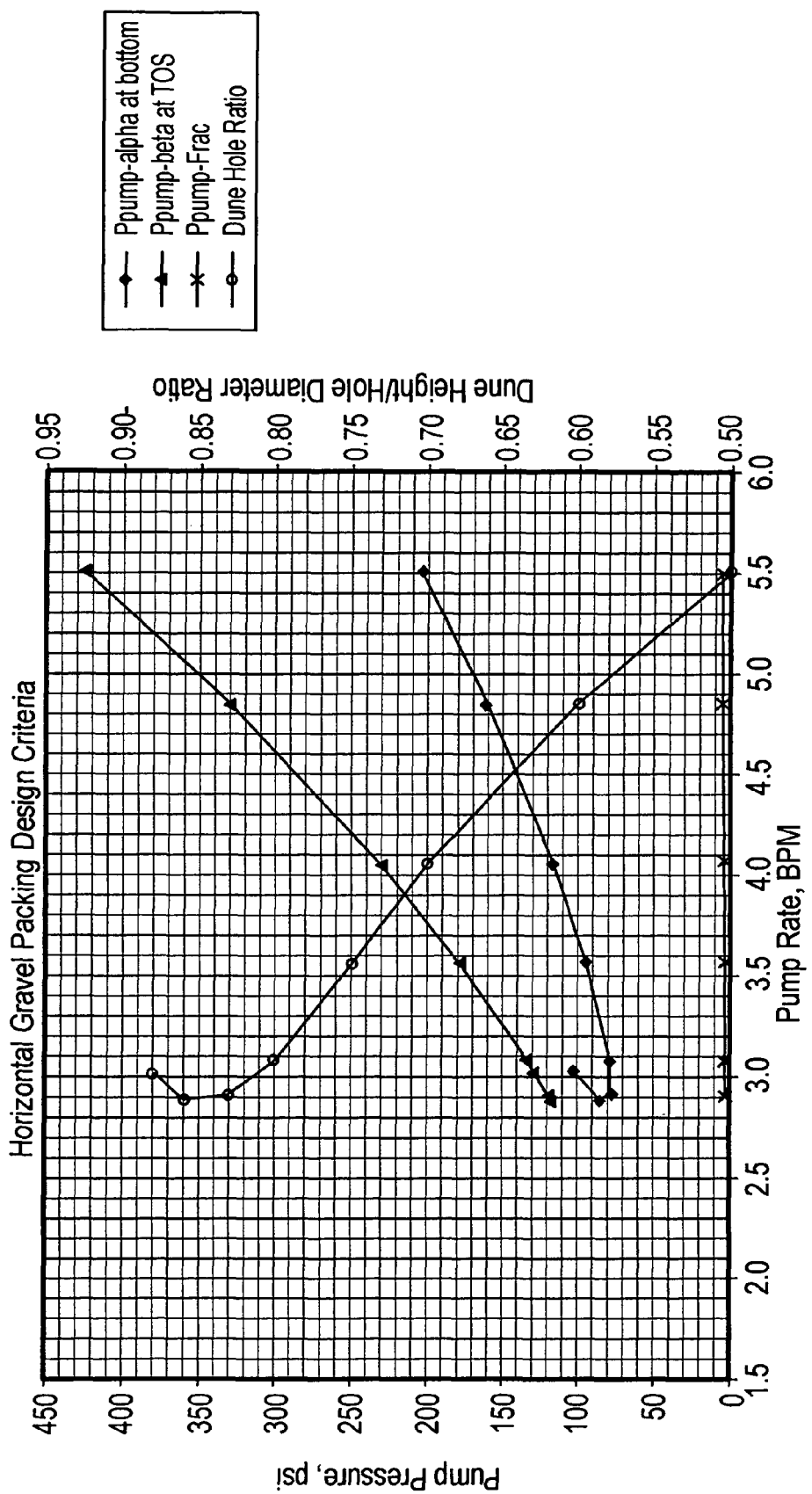
FIG. 4 shows the estimated Pressure and Dune/Hole ratio as a function of Rate for the horizontal gravel packing of Example 4 using effective screen ID and pipe roughness of 0.03.

FIG. 4 shows the estimated Pressure and Dune/Hole ratio as a function of Rate. The estimated dune/hole ratio was about 0.703 when using base pipe ID as screen ID, and was about 0.757 when using effective screen ID as screen ID. The estimated alpha and beta pressures were 434 kPa (63 psi) and 1,448 kPa (210 psi) using base pipe ID as screen ID and pipe roughness of 0.0254 cm (0.01 in). The estimated alpha and beta pressures were 627 kPa (91 psi) and 1,172 kPa (170 psi) using effective screen ID as screen ID and pipe roughness of 0.0762 cm (0.03 in).

Example 5

Comparing Measured Data and Estimated Data from Examples 1-4

FIG. 5 displays the measured data and estimated data using both base pipe ID and effective screen ID as screen ID. Although the screen was centralized, estimated data showed that it behaved close to the non-centralized screen. The estimated data shown in FIG. 5 used the non-centralized screen option.

Measured dune/hole ratios were stabilized values at windows 3-4 for test 1 and at windows 2 & 3 for test 2. With no fluid loss and if screen was not plugged, dune height was expected to be the same at all windows. In test 1, the measured dune/height ratio at window #5 jumped to over 0.9 compared with 0.64 in window #4. In test 2, the measured dune/height ratio at window #4 jumped to 0.9 compared with 0.56 in window #3. These abnormal increase implied obstruction in the system or bottom of the screen was plugged.

When using base pipe ID as screen ID and pipe roughness of 0254 cm (0.01 in)], the measured stabilized dune heights were higher than the estimated values: 2.4% higher in test 1, 7.7% higher in test 2, and 12.4% higher in test 3.

The measured alpha pressures were much higher than the estimated values in all tests, 55% higher in test 1, 69% higher in test 2, and 35% higher in test 3. The measured beta pressures were within 5% of the estimated values. High alpha pressures with normal beta pressures may indicate that the bottom of the screen was plugged. In test 2, sand bridged off above window #6. This also implied that the screen bottom was plugged.

When using effective screen ID as screen ID (and pipe roughness to match pressures), the measured dune heights were lower than the estimated values for IGPCF fluid tests: 11.7% lower in test 1 and 1.4% lower in test 2. For the water test, the measured dune height was 4.4% higher than the estimated value.

Matching both alpha pressure and beta pressure to measured pressures resulted in the apparent pipe roughness about 0.1524 cm (0.06 inch) for the IGPCF tests 1 and 2, and about 0.0762 cm (0.03 inch) for the water test 3. Roughness value above 0.0254 cm (0.01 inch) was considered abnormally high.

It was decided that the foregoing results may be due to ineffective wetting of the gravel.

Example 6

Wetting was evaluated by mixing 12 grams of 20/40 pack sand with 15 ml of 1.26 g/cc (10.5 lb/gal) solids-free invert emulsion (see formula in Example 7). Baseline comparisons were prepared using n-paraffin and water. The sand/fluid mixture was then shaken (mixed) and the sand was allowed to settle. Finally, the heights of the settled sand were compared with the vial containing the dry sand. Very similar sand height was observed in the 4 samples after the total separation of the sand and liquids.

The sand settling was evaluated as follows. The temperature of the gel was measured and recorded. A syringe was used to transfer 516.4 cc of gel into a polyethylene bottle. 376.7 cc of dry 420-250 micron (40-60 mesh) gravel was placed in a graduated cylinder, tapping the cylinder periodically to allow the gravel to completely settle. The gravel from the cylinder was then poured into the polyethylene bottle containing the invert emulsion or control. The bottle was capped and shaken vigorously until the gravel was evenly dispersed in the carrier. The slurry was poured into the graduated cylinder up to the 500 cc mark. The graduated cylinder was set on a level surface at room temperature and the graduations of clear fluid were measured at 10, 20, and 30 minutes. Each graduation was one percent of the total cylinder volume. The number of graduations of clear fluid for 30 minutes of elapsed time was measured to obtain the sand settling in percent settling per 30 minutes. The analysis was performed at room temperature, 15.56° C. (60° F.), and 32.22° C. (90° F.) to establish the base values for the gel system. The base values were established using 420-250 micron (40-60 mesh) gravel.

Figure 6:
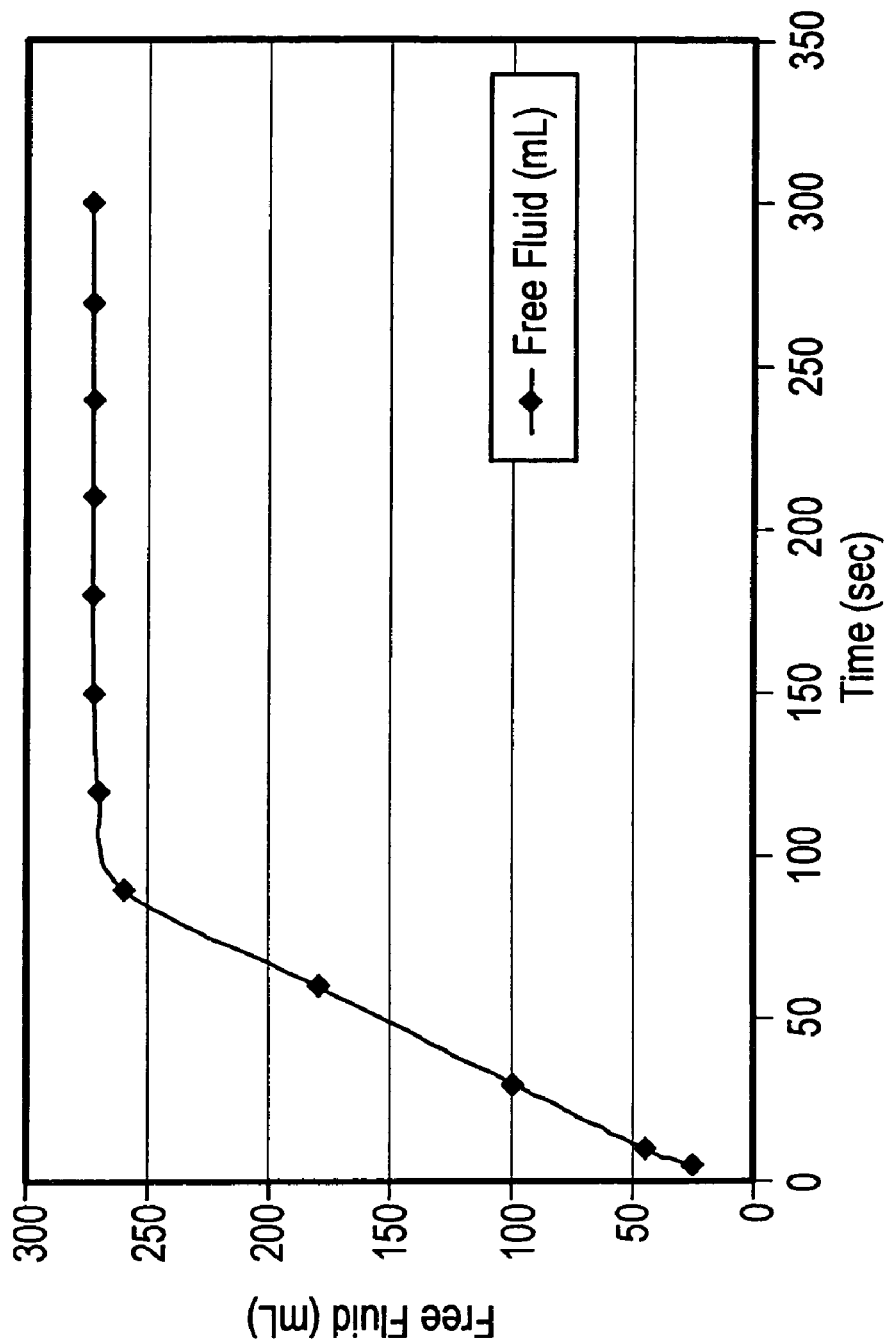
FIG. 6 is a chart of the free fluid vs. time from the sand settling and wetting evaluations of Example 6.

The results are shown in FIG. 6. In the n-paraffin, the total separation of the sand and the invert emulsion carrier fluid was reached after about 100 seconds, reaching the initial sand height of 25 ml.

Example 7

A study was performed to determine if solids-free invert emulsion gravel pack carrier fluids prepared with paraffin base fluid meet the requirements for a gravel pack carrier fluid. Three solids-free invert emulsions were formulated and evaluated to determine:

a. Rheological properties at three densities: 1.14, 1.2 and 1.26 g/cc (9.5, 10, and 10.5 lb/gal).
b. Long term emulsion stability at 93° C. (200° F.). The goal is to have a fluid that will not separate after 8 hours in the field. The testing included up to 48-hrs of static testing.
c. Rheological properties of the 1.26 g/cc (10.5 lb/gal) carrier fluid contaminated with 3% low-gravity solids
d. Compatibility of the 1.26 g/cc (10.5 lb/gal) carrier fluid with the 1.26 g/cc (10.5 lb/gal) conditioned drilling fluid
e. Wetting characteristics of the invert carrier fluid at 1.26 g/cc (10.5 lb/gal) with 20/40 pack sand.
f. Filtrate invasion after displacement to solids-free invert
   i. Quantity of filtration invasion after displacement to solids-free invert
   ii. Whether the solids-free filtration is damaging to sandstone.
g. Compatibility of the gravel pack carrier fluids' filtrate with formation fluids.

The solids-free invert emulsion fluids were formulated with densities between 1.2 and 1.26 g/cc (9.5 and 10.5 lb/gal) using the additive concentrations listed in the following Table:

TABLE 6

Fluid formulations and properties

| | Fluid density, lb/gal | | |
|---|---|---|---|
| | 9.5 | 10.0 | 10.5 |
| n-paraffin*, m$^3$ | 0.5846 | 0.5195 | 0.4545 |
| CARBO-MUL, kg/m$^3$ | 17.1 | 17.1 | 17.1 |
| BIO-COTE, kg/m$^3$ | 11.4 | 11.4 | 11.4 |
| 14.2 ppg CaBr$_2$ brine, m$^3$ | 0.3843 | 0.4493 | 0.5143 |
| Oil/brine ratio | 62/38 | 55/45 | 49/51 |
| Initial properties at 120° F. | | | |
| Plastic Viscosity, cp | 12 | 17 | 24 |
| Yield Point, lb/100 sq ft | 1 | 1 | 2 |
| 200-rpm reading | 9 | 12 | 18 |
| 100-rpm reading | 5 | 6 | 9 |
| 6-rpm reading | 0 | 0 | 0 |
| 3-rpm reading | 0 | 0 | 0 |
| 10-sec Gel, lb/100 sq ft | 0 | 0 | 0 |
| 10-min Gel, lb/100 sq ft | 0 | 0 | 0 |
| Electrical stability, volts | 400 | 440 | 450 |
| Final properties at 120° F. | | | |
| Aging conditions: static | 48 hrs at 200° F. | 48 hrs at 200° F. | 48 hrs at 200° F. |
| Plastic Viscosity, cp | 7 | 11 | 18 |
| Yield Point, lb/100 sq ft | 1 | 0 | 1 |
| 200-rpm reading | 5 | 8 | 13 |
| 100-rpm reading | 3 | 4 | 7 |
| 6-rpm reading | 0 | 0 | 0 |
| 3-rpm reading | 0 | 0 | 0 |
| 10-sec Gel, lb/100 sq ft | 0 | 0 | 0 |
| 10-min Gel, lb/100 sq ft | 0 | 0 | 0 |
| Electrical stability, volts | 200 | 200 | 220 |

*The n-paraffin was PARAFINA PURA (Brazil).

The fluids were mixed and hot rolled at 65.56° C. (150° F.), and then evaluated in a 48-hour static test at 93.33° C. (200° F.). The initial and final rheological properties measured with the FANN 35 also are shown in the foregoing Table. The rheological properties obtained after hot roll did not exhibit any changes when the samples were exposed to static aging for 48 hours. The results satisfied the specifications for an invert emulsion gravel pack carrier fluid, listed below.

The carrier fluid exhibited near-Newtonian behavior with zero or near-zero values for yield point, low rpm reading and gel strength.

The carrier fluid remained stable (no brine breakout) for 48-hours during static testing The results using standard CARBO-MUL™ met the specifications.

Example 8

The 1.26 g/cc (10.5 lb/gal) carrier fluid of Example 7 was contaminated with 3 vol. % REV-DUST™ [76.95 kg/m³ (27 lb/bbl)], based on the volume of the carrier fluid. REV-DUST™ is a simulated drilled product available from Mil-White Company, Houston, Tex. The REV-DUST™ was used to simulate contamination with low-gravity solids. The contaminated fluid exhibited rheological properties similar to the solids-free fluid. This indicated that the solids-free formulation had enough wetting agent to handle solids contamination without altering rheological properties. Slight increases in plastic viscosity and in electrical stability were noted. The results are given in the following Table:

TABLE 7

Contamination tests of 1.26 g/cc (10.5 lb/gal) solids-free invert emulsion with REV-DUST™

|  | Solids-free IE | Solids-free IE contaminated w/Rev-dust |
|---|---|---|
| n-paraffin*, m³ | 0.4545 | 0.4545 |
| CARBO-MUL ™, kg/m³ | 17.1 | 17.1 |
| BIO-COTE ™, kg/m³ | 11.4 | 11.4 |
| 14.2 ppg CaBr₂ brine, m³ | 0.5143 | 0.5143 |
| REV-DUST ™, % | — | 3 |
| Oil/brine ratio | 49/51 | 49/51 |
| Properties at 120° F. | | |
| Aging conditions: dynamic | 16 hrs at 65.56° C. (150° F.) | 16 hrs at 65.56° C. (150° F.) |
| Plastic Viscosity, cp | 18 | 22 |
| Yield Point, lb/100 sq ft | 1 | 1 |
| 200-rpm reading | 13 | 16 |
| 100-rpm reading | 7 | 8 |
| 6-rpm reading | 0 | 0 |
| 3-rpm reading | 0 | 0 |
| 10-sec Gel, lb/100 sq ft | 0 | 0 |
| 10-min Gel, lb/100 sq ft | 0 | 1 |
| Electrical stability, volts | 340 | 270 |

In addition, the rheological properties were measured on samples of the solids-free fluid having the following formulation:

|  | Drilling fluid |
|---|---|
| n-paraffin, m³ | 0.5606 |
| CARBO-GEL*, kg/m³ | 14.25 |
| CARBO-MUL HT**, kg/m³ | 28.5 |
| CARBO-TEC S***, kg/m³ | 4.28 |

-continued

|  | Drilling fluid |
|---|---|
| 97% CaCl₂, kg/m³ | 87.2 |
| Water, bbl | 0.2529 |
| MIL-BAR, kg/m³ | 330 |
| REV-DUST ™, % | 4 |
| Oil/brine ratio | 70/30 |
| Density, g/cc | 1.26 |

Based on the total volume of the solids free fluid, the solids free fluid was contaminated with (1) 5 vol. % and 10 vol. % of the 1.26 g/cc (10.5 lb/gal) highly-viscous drilling fluid from Example 7, and (2) 5 vol. % and 10 vol. % of synthetic formation water. The results, shown below in Tables 8 and 9, indicate that contamination with 5 vol. % or 10 vol. % of the fluid from Example 7 did not affect the, rheological properties of the carrier fluid.

TABLE 8

Contamination tests of 10.5 lb/gal solids-free invert emulsion with drilling fluid

| Properties at 48.89° C. (120° F.) | Drilling fluid | Drilling fluid/ Solids-free IE: 5/95 | Drilling fluid/ Solids-free IE: 10/90 |
|---|---|---|---|
| Aging conditions | Dynamic: 16 hrs at 65.5° C. (150° F.) | Stirred 5 minutes | Stirred 5 minutes |
| Plastic Viscosity, cp | 25 | 18 | 18 |
| Yield Point, lb/100 sq ft | 39 | 1 | 1 |
| 200-rpm reading | 54 | 13 | 13 |
| 100-rpm reading | 43 | 7 | 7 |
| 6-rpm reading | 23 | 0 | 0 |
| 3-rpm reading | 21 | 0 | 0 |
| 10-sec Gel, lb/100 sq ft | 22 | 0 | 0 |
| 10-min Gel, lb/100 sq ft | 23 | 0 | 0 |
| Electrical stability, volts | 630 | 340 | 360 |

*CARBO-GEL ™ is an organophilic clay available from Baker Hughes Drilling Fluids.
**CARBO-MUL HT ™ is a polyamine emulsifier, commercially available from Baker Hughes Drilling Fluids.
***CARBO-TEC S ™ is a dimer-trimer fatty acid, commercially available from Baker Hughes Drilling Fluids.

TABLE 9

Contamination tests of 1.26 g/cc (10.5 lb/gal) solids-free invert emulsion ("IE") with formation water

| Properties at 48.89° C. (120° F.) | | Formation water/ Solids-free IE: 5/95 | Formation water/ Solids-free IE: 10/90 |
|---|---|---|---|
| Aging conditions | 16 hrs at 150° F. | Stirred 5 minutes | Stirred 5 minutes |
| Plastic Viscosity, cp | 18 | 21 | 21 |
| Yield Point, lb/100 sq ft | 1 | 1 | 1 |
| 200-rpm reading | 13 | 15 | 17 |
| 100-rpm reading | 7 | 8 | 9 |
| 6-rpm reading | 0 | 0 | 0 |
| 3-rpm reading | 0 | 0 | 0 |
| 10-sec Gel, lb/100 sq ft | 0 | 0.5 | 0.5 |
| 10-min Gel, lb/100 sq ft | 0 | 1 | 1 |
| Electrical stability, volts | 340 | 400 | 440 |

Example 9

Figure 7:
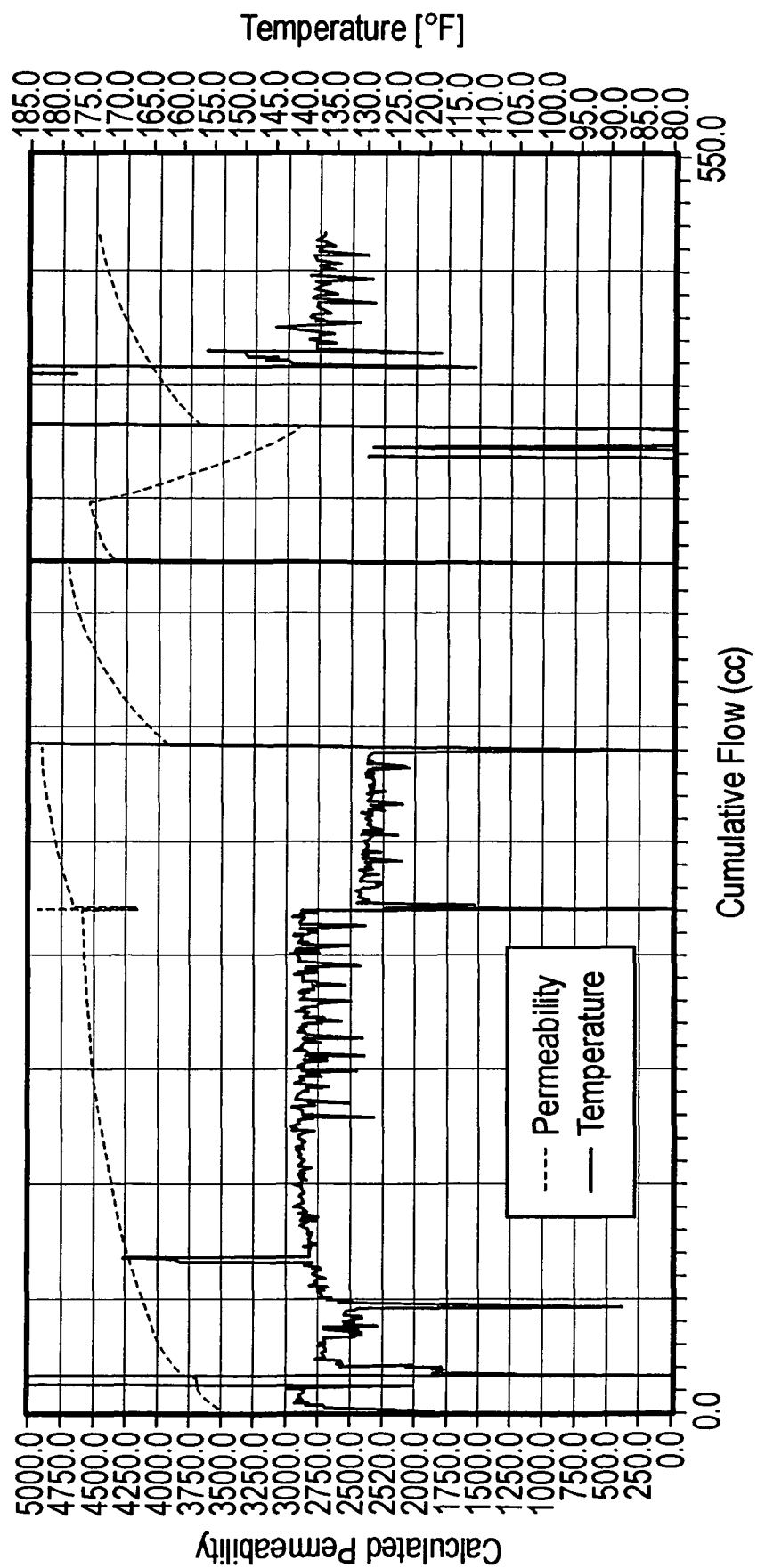
FIG. 7 is a chart of the Permeability Test Results of Example 9.
Figure 8:
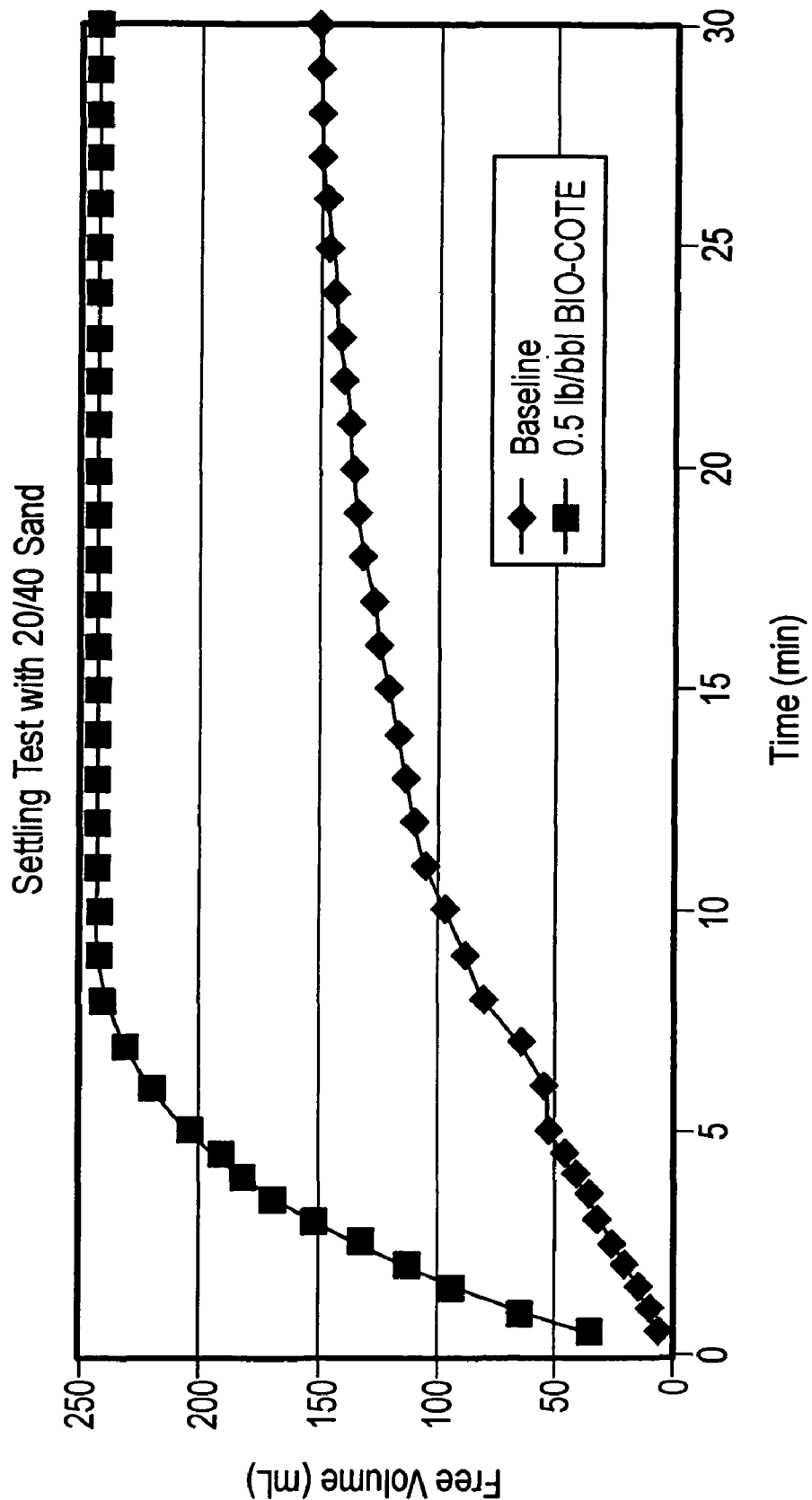
FIG. 8 is a chart of the free fluid vs. Time from the sand settling of Example 10.

A return permeability test was carried out to evaluate the impact of filtrate invasion of the solids-free invert emulsion on formation damage. The test was performed using 2.8 Darcy Berea sandstone and the 1.26 g/cc (10.5 lb/gal) solids-free invert emulsion fluid of Example 7 at 93.33° C. (200° F.), which flowed through the core because no filter cake existed. The results of the test showed an initial permeability of 2867.2 and a return permeability of 2719.8, or a permeability return of 95%, indicating no potential damage to the sandstone formation (see FIG. 7).

Example 10

The IGPCF of Example 7 is used in the procedures of Example 1. Distinct alpha wave and beta waves are observed. Similar dune heights are observed at all windows. A complete tight pack is achieved.

Example 11

Two viscous IGPCF's having the following composition and properties were prepared:

|  | Sample No. | |
| --- | --- | --- |
|  | 1 | 2 |
| EDC 99/DW, m$^3$ | 0.5458 | 0.5458 |
| CARBO-GEL, kg/m$^3$ | 8.55 | 8.55 |
| CARBO-MUL, kg/m$^3$ | 22.8 | 22.8 |
| BIO-COTE, kg/m$^3$ | — | 1.43 |
| 14.2 lb/gal CaBr$_2$ Brine, m$^3$ | 0.4294 | 0.4294 |
| Oil/Brine Ratio | 57/43 | 57/43 |
| Density, lb/gal | 10.0 | 10.0 |
| Plastic Viscosity, cP | 27 | 28 |
| Yield Point, lb/100 sq ft | 8 | 6 |
| 200-rpm Reading | 25 | 23 |
| 100-rpm Reading | 14 | 12 |
| 6-rpm Reading | 3 | 1 |
| 3-rpm Reading | 2 | 1 |
| 10-sec Gel, lb/100 sq ft | 3 | 2 |
| 10-min Gel, lb/100 sq ft | 4 | 2 |
| Electrical stability, volts | 480 | 490 |

*EDC-99/DW is a hydrogenated mineral, available from Total Fina Elf.

The sand settling was evaluated as in Example 5. The results are given in the following Table and illustrated in FIG. 6. Substantial settling was seen in the sample containing BIO-COTE™ compared to the sample without BIO-COTE™, indicating that the BIO-COTE™ substantially improved the settling rate and tightness of the pack.

| Fluid #1 Time (min) | Fluid #1 Free Vol (mL) | Fluid #2 Free Vol (mL) |
| --- | --- | --- |
| 0.5 | 6 | 35 |
| 1 | 10 | 65 |
| 1.5 | 14 | 94 |
| 2 | 21 | 112 |
| 2.5 | 26 | 132 |
| 3 | 32 | 152 |
| 3.5 | 35 | 170 |
| 4 | 41 | 182 |
| 4.5 | 46 | 191 |
| 5 | 52 | 204 |
| 6 | 55 | 220 |
| 7 | 65 | 230 |
| 8 | 80 | 240 |
| 9 | 88 | 242 |
| 10 | 97 | 243 |
| 11 | 105 | 243 |
| 12 | 110 | 243 |
| 13 | 113 | 243 |
| 14 | 117 | 243 |
| 15 | 120 | 243 |
| 16 | 125 | 243 |
| 17 | 127 | 243 |
| 18 | 131 | 243 |
| 19 | 134 | 243 |
| 20 | 136 | 243 |
| 21 | 137 | 243 |
| 22 | 140 | 243 |
| 23 | 142 | 243 |
| 24 | 144 | 243 |
| 25 | 146 | 243 |
| 26 | 148 | 243 |
| 27 | 150 | 243 |
| 28 | 151 | 243 |
| 29 | 151 | 243 |
| 30 | 152 | 243 |

Persons of ordinary skill in the art will recognize that many modifications may be made to the foregoing without departing there from.

We claim:

1. A gravel pack carrier fluid comprising an invert emulsion comprising oil as an external phase, clear brine as an internal phase, and a type and quantity of emulsifier having an HLB of from 3 to 8 effective to produce a stable invert emulsion, the external phase of the gravel pack carrier fluid further comprising a type and quantity of gravel wetting agent having a HLB of about 4 or less effective to render the gravel oil wet.

2. The gravel pack carrier fluid of claim 1 wherein the emulsifier is selected from the group consisting of amides and imidazolines.

3. The gravel pack carrier fluid of claim 1 wherein the emulsifier comprises imidazoline.

4. The gravel pack carrier fluid of claim 1, the fluid comprising from about 0.06 g/cc (0.5 gal/bbl) to about 0.24 g/cc (2.0 gal/bbl) emulsifier, based on the volume of invert emulsion to be produced; the emulsifier comprising a solution comprising from about 50 to about 70 wt. % emulsifier, the remainder comprising emulsifier base oil.

5. The gravel pack carrier fluid of claim 4 wherein the emulsifier base oil comprises mineral oil comprising alcohol.

6. The gravel pack carrier fluid of claim 1 wherein the gravel wetting agent comprises an active ingredient selected from the group consisting of dodecyl benzene sulfonate, calcium salts of fatty acids, glycerol triesters, sorbitan esters, lecithin, fatty alcohols, and combinations thereof.

7. The gravel pack carrier fluid of claim 1 wherein the gravel wetting agent comprises polyolefin amide alkene amine as active ingredient.

8. The gravel pack carrier fluid of claim 1 wherein:
the gravel pack carrier fluid is solids-free, remains stable under static conditions at 121.11° C. (250° F.) for two weeks or more, comprises substantially Newtonian rheological properties at temperatures of from about 4.44° C. (40° F.) to about 121.11° C. (250° F.), as determined under pressure using a FANN 75 rheometer, and comprises one or more viscosifying agents which achieve non-Newtonian rheology comprising a viscosity of about 10 cP or less at 300 rpm; and, the gravel wetting agent comprises diluent which is soluble in the external phase of the invert emulsion.

9. The gravel pack carrier fluid of claim 8 wherein the diluent is selected from the group consisting of n-paraffins, mineral oil, olefins, and combinations thereof.

10. The gravel pack carrier fluid of claim 8 comprising:
from about 5.95 liters/m$^3$ (0.25 gal/bbl) to about 23.8 liters/m$^3$ (1.0 gal/bbl) or more total volume of the gravel wetting agent, including one or more active ingredients and any diluent;
a density of from about 0.84 g/cc (7 lb/gal) to 1.56 g/cc (13.0 lb/gal);
a viscosity of about 20 cP or less at 300 rpm;
wherein the clear brine has a density of about 1.0 g/cc (8.34 lb/gal) or more.

11. The gravel pack carrier fluid of claim 1 wherein the clear brine has an oil to brine ratio of 45/55 or more.

12. A method for gravel packing a wellbore comprising:
providing a stable invert emulsion comprising oil as an external phase, clear brine as an internal phase, and a type and amount of emulsifier effective to produce a stable emulsion;
after producing the stable emulsion, providing the stable emulsion with a type and quantity of gravel wetting agent effective to render the gravel oil wet, thereby producing a modified invert emulsion;
injecting the modified invert emulsion into a wellbore with gravel, the modified invert emulsion facilitating a faster settling rate during the "alpha wave" of an "alpha-beta" gravel packing procedure and producing an effective, tight gravel pack;
circulating the modified invert emulsion downhole to establish the required annular flow rate to gravel pack the wellbore; and,
infusing additional gravel into the wellbore with an amount of additional wetting agent comprising one or more active ingredient, producing a gravel pack carrier fluid, the amount of additional wetting agent being effective to achieve and maintain near Newtonian rheological behavior of the gravel pack carrier fluid; wherein a sufficient amount of additional wetting agent is infused to provide the gravel pack carrier fluid comprising a concentration of about 2.9 liters/m$^3$ (⅛ gal/bbl) or more of the one or more active ingredient.

13. A method for gravel packing a wellbore comprising:
providing a stable invert emulsion comprising oil as an external phase, clear brine as an internal phase, and a type and amount of emulsifier in an amount effective to produce a stable emulsion;
after producing the stable emulsion, providing the stable emulsion with a type and quantity of gravel wetting agent effective to render the gravel oil wet, thereby producing a modified invert emulsion; and,
injecting the modified invert emulsion into a wellbore with gravel, the modified invert emulsion facilitating a faster settling rate during the "alpha wave" of an "alpha-beta" gravel packing procedure and producing an effective, tight gravel pack; and,
substantially continuously infusing gravel and from about 5.95 liters/m$^3$ (0.25 gal/bbl) to about 23.8 liters/m$^3$ (1.0 gal/bbl) wetting agent into the wellbore with the modified invert emulsion.

14. The method of claim 13 comprising using said modified invert emulsion as a well servicing fluid other than a gravel pack carrier fluid.

15. The method of claim 13 wherein said wellbore is a horizontal wellbore.

16. The method of claim 15 wherein the gravel pack carrier fluid maintains shale stability before and during the gravel packing operation.

17. A method for gravel packing a wellbore comprising:
providing a stable invert emulsion comprising oil as an external phase, clear brine as an internal phase, and an amount and type of emulsifier effective to produce a stable emulsion;
after producing the stable emulsion, injecting the stable emulsion into a wellbore together with an amount of gravel and a type and quantity of gravel wetting agent effective to render the gravel oil-wet, thereby facilitating a faster gravel settling rate during the "alpha wave" of an "alpha-beta" gravel packing procedure and producing an effective, tight gravel pack;
substantially continuously infusing gravel and from about 5.95 liters/m$^3$ (0.25 gal/bbl) to about 23.8 liters/m$^3$ (1.0 gal/bbl) wetting agent into the wellbore with the stable invert emulsion.

18. The method of claim 17 comprising using said modified invert emulsion as a well servicing fluid other than a gravel pack carrier fluid.

19. The method of claim 17 wherein said wellbore is a horizontal wellbore.

20. The method of claim 17 wherein the gravel pack carrier fluid maintains shale stability before and during the gravel packing operation.

21. The method of claim 17 comprising:
mixing from about 0.4 to about 0.7 barrels of oil with 1.43 kg/m$^3$ (0.5 gal/bbl) to about 5.7 kg/m$^3$ (2.0 gal/bbl) emulsifier, based on the volume of stable invert emulsion produced, producing an oil/emulsifier mixture;
mixing from about 4.76 liters/m$^3$ (0.2 gal/bbl) to about 14.26 liters/m$^3$ (0.6 gal/bbl) clear brine with the oil/emulsifier mixture, based on the total volume of the oil/emulsifier mixture, producing a stable invert emulsion; and,
injecting the stable invert emulsion into a wellbore while substantially continuously infusing from about 5.9 liters/m$^3$ (0.25 gal/bbl) to about 23.8 liters/m$^3$ (1.0 gal/bbl) gravel wetting agent, based on the total volume of the stable invert emulsion.

22. A method for gravel packing a wellbore comprising:
providing a stable invert emulsion comprising oil as an external phase, clear brine as an internal phase, and an amount and type of emulsifier effective to produce a stable emulsion;
after producing the stable emulsion, injecting the stable emulsion into a wellbore together with an amount of gravel and a type and quantity of gravel wetting agent effective to render the gravel oil-wet, thereby facilitating a faster gravel settling rate during the "alpha wave" of an "alpha-beta" gravel packing procedure and producing an effective, tight gravel pack;
circulating said invert emulsion gravel pack carrier fluid downhole to establish the required annular flow rate to gravel pack the wellbore; and
infusing additional gravel into the wellbore with an amount of additional wetting agent comprising active ingredient, producing a gravel pack carrier fluid, the amount of additional wetting agent being effective to achieve and maintain near Newtonian rheological behavior of the gravel pack carrier fluid; wherein a sufficient amount of additional wetting agent is infused to provide the gravel pack carrier fluid comprising a concentration of about 2.9 liters/m$^3$ (⅛ gal/bbl) or more of the one or more active ingredient.

23. The method of claim 22 wherein circulating said invert emulsion gravel pack carrier fluid downhole comprises substantially continuously infusing gravel and from about 5.95 liters/m³ (0.25 gal/bbl) to about 23.8 liters/m³ (1.0 gal/bbl) wetting agent into the wellbore with the stable invert emulsion.

24. A gravel pack carrier fluid comprising an invert emulsion comprising oil as an external phase, clear brine as an internal phase, and a type and amount of emulsifier effective to produce a stable invert emulsion, the gravel pack carrier fluid further comprising a type and quantity of gravel wetting agent effective to render the gravel oil wet, the quantity being from about 5.95 liters/m³ (0.25 gal/bbl) to about 23.8 liters/m³ (1.0 gal/bbl), based on the volume of the stable invert emulsion.

25. The gravel pack carrier fluid of claim 24 wherein the gravel wetting agent comprises one or more active ingredients and the gravel pack carrier fluid comprises a concentration of about 2.9 liters/m³ (1.8 gal/bbl) of the one or more active ingredients.

26. The gravel pack carrier fluid of claim 25 wherein
the emulsifier has an HLB of from 3 to 8; and,
the gravel wetting agent has a HLB of about 4 or less.

27. The gravel pack carrier fluid of claim 26 wherein the emulsifier is selected from the group consisting of amides and imidazolines.

28. The gravel pack carrier fluid of claim 26 wherein the emulsifier comprises imidazoline.

29. The gravel pack carrier fluid of claim 25, the fluid comprising from about 0.06 g/cc (0.5 gal/bbl) to about 0.24 g/cc (2.0 gal/bbl) emulsifier, based on the volume of invert emulsion to be produced; the emulsifier comprising a solution comprising from about 50 to about 70 wt. % emulsifier, the remainder comprising emulsifier base oil.

30. The gravel pack carrier fluid of claim 29 wherein the emulsifier base oil comprises mineral oil comprising alcohol.

31. The gravel pack carrier fluid of claim 25 wherein the gravel wetting agent comprises an active ingredient selected from the group consisting of dodecyl benzene sulfonate, calcium salts of fatty acids, glycerol triesters, sorbitan esters, lecithin, fatty alcohols, and combinations thereof.

32. The gravel pack carrier fluid of claim 25 wherein the gravel wetting agent comprises polyolefin amide alkene amine as active ingredient.

33. The gravel pack carrier fluid of claim 25 wherein:
the gravel pack carrier fluid is solids-free, remains stable under static conditions at 121.11° C. (250° F.) for two weeks or more, comprises substantially Newtonian rheological properties at temperatures of from about 4.44° C. (40° F.) to about 121.11° C. (250° F.), as determined under pressure using a FANN 75 rheometer, and comprises one or more viscosifying agents which achieve non-Newtonian rheology comprising a viscosity of about 10 cP or less at 200 rpm; and,
the gravel wetting agent comprises diluent which is soluble in the external phase of the invert emulsion.

34. The gravel pack carrier fluid of claim 33 wherein the diluent is selected from the group consisting of n-paraffins, mineral oil, olefins, and combinations thereof.

35. The gravel pack carrier fluid of claim 33 wherein:
the gravel pack carrier fluid comprises a density of from about 0.84 g/cc (7 lb/gal) to 1.56 g/cc (13.0 lb/gal) and a viscosity of about 20 cP or less at 300 rpm; and,
the clear brine has a density of about 1.0 g/cc (8.34 lb/gal) or more.

36. The gravel pack carrier fluid of claim 25 comprising an oil to brine ratio of 45/55 or more.

37. A gravel pack carrier fluid comprising an invert emulsion comprising oil as an external phase, clear brine as an internal phase, a type and quantity of emulsifier effective to produce a stable invert emulsion, and a type and quantity of gravel wetting agent effective to render the gravel oil wet, the gravel wetting agent comprising one or more active ingredients, the quantity of gravel wetting agent producing a concentration of about 2.9 liters/m³ (⅛ gal/bbl) or more of the one or more active ingredients in the gravel pack carrier fluid.

38. The gravel pack carrier fluid of claim 37 comprising:
a density of from about 0.84 g/cc (7 lb/gal) to 1.56 g/cc (13.0 lb/gal);
a viscosity of about 20 cP or less at 300 rpm;
wherein the clear brine has a density of about 1.0 g/cc (8.34 lb/gal) or more.

39. A method for gravel packing a wellbore comprising:
providing an invert emulsion comprising oil as an external phase, clear brine as an internal phase, and a type and amount of emulsifier sufficient to produce a stable invert emulsion;
injecting the stable invert emulsion into a wellbore together with an amount of gravel and a type and quantity of gravel wetting agent effective to render the gravel oil-wet and to produce an effective, tight gravel pack;
substantially continuously infusing gravel and from about 5.95 liters/m³ (0.25 gal/bbl) to about 23.8 liters/m³ (1.0 gal/bbl) gravel wetting agent into the wellbore with the stable invert emulsion.

40. The method of claim 39 comprising using said modified invert emulsion as a well servicing fluid other than a gravel pack carrier fluid.

41. The method of claim 39 wherein said wellbore is a horizontal wellbore.

42. The method of claim 39 wherein the gravel pack carrier fluid maintains shale stability before and during the gravel packing operation.

43. The method of claim 39 comprising:
mixing from about 0.4 to about 0.7 barrels of oil with 1.43 kg/m³ (0.5 gal/bbl) to about 5.7 kg/m³ (2.0 gal/bbl) emulsifier, based on the volume of stable invert emulsion produced, producing an oil/emulsifier mixture;
mixing from about 4.76 liters/m³ (0.2 gal/bbl) to about 14.26 liters/m³ (0.6 gal/bbl) clear brine with the oil/emulsifier mixture, based on the total volume of the oil/emulsifier mixture, producing a stable invert emulsion; and,
injecting the stable invert emulsion into a wellbore while substantially continuously infusing from about 5.9 liters/m³ (0.25 gal/bbl) to about 23.8 liters/m³ (1.0 gal/bbl) gravel wetting agent, based on the total volume of the stable invert emulsion.

44. A method for gravel packing a wellbore comprising:
providing an invert emulsion comprising oil as an external phase, clear brine as an internal phase, and a type and amount of emulsifier sufficient to produce a stable invert emulsion;
injecting the stable invert emulsion into a wellbore together with an amount of gravel and a type and quantity of gravel wetting agent effective to render the gravel oil-wet and to produce an effective, tight gravel pack;
circulating said invert emulsion gravel pack carrier fluid downhole to establish the required annular flow rate to gravel pack the wellbore; and
infusing additional gravel into the wellbore with an amount of additional gravel wetting agent comprising one or more active ingredient, producing a gravel pack carrier fluid, the amount of additional gravel wetting agent being effective to achieve and maintain near Newtonian rheological behavior of gravel pack carrier fluid; wherein a sufficient amount of additional gravel wetting agent is infused to provide gravel pack carrier fluid comprising a concentration of about 2.9 liters/m$^3$ (⅛ gal/bbl) or more of the one or more active ingredient.

45. The method of claim 44 wherein circulating said invert emulsion gravel pack carrier fluid downhole comprises substantially continuously infusing gravel and from about 5.95 liters/m$^3$ (0.25 gal/bbl) to about 23.8 liters/m$^3$ (1.0 gal/bbl) gravel wetting agent into the wellbore with the stable invert emulsion.

46. A method for gravel packing a wellbore comprising:
providing a stable invert emulsion comprising oil as an external phase, clear brine as an internal phase, and an amount and type of emulsifier effective to produce a stable invert emulsion;
providing the stable invert emulsion with gravel and a type and quantity of gravel wetting agent effective to render the gravel oil wet, thereby producing a modified invert emulsion; and,
injecting the modified invert emulsion into a wellbore with gravel, thereby facilitating a faster gravel settling rate during the "alpha wave" of an "alpha-beta" gravel packing procedure and producing an effective, tight gravel pack;
substantially continuously infusing gravel and from about 5.95 liters/m$^3$ (0.25 gal/bbl) to about 23.8 liters/m$^3$ (1.0 gal/bbl) wetting agent into the wellbore with the modified invert emulsion.

47. The method of claim 46 comprising using said modified invert emulsion as a well servicing fluid other than a gravel pack carrier fluid.

48. The method of claim 46 wherein said wellbore is a horizontal, wellbore.

49. The method of claim 46 wherein the gravel pack carrier fluid maintains shale stability before and during the gravel packing operation.

50. A method for gravel packing a wellbore comprising:
providing a stable invert emulsion comprising oil as an external phase, clear brine as an internal phase, and an amount and type of emulsifier effective to produce a stable invert emulsion;
providing the stable invert emulsion with gravel and a type and quantity of gravel wetting agent effective to render the gravel oil wet, thereby producing a modified invert emulsion;
injecting the modified invert emulsion into a wellbore with gravel, thereby facilitating a faster gravel settling rate during the "alpha wave" of an "alpha-beta" gravel packing procedure and producing an effective, tight gravel pack
circulating the modified invert emulsion downhole to establish the required annular flow rate to gravel pack the wellbore; and,
infusing additional gravel into the wellbore with an amount of additional wetting agent comprising active ingredient, producing a gravel pack carrier fluid, the amount of additional wetting agent being effective to achieve and maintain near Newtonian rheological behavior of the gravel pack carrier fluid; wherein a sufficient amount of additional wetting agent is infused to provide the gravel pack carrier fluid comprising a concentration of about 2.9 liters/m$^3$ (⅛ gal/bbl) or more of the active ingredient.

51. The method of claim 50 wherein circulating the modified invert emulsion downhole comprises substantially continuously infusing gravel and from about 5.95 liters/m$^3$ (0.25 gal/bbl) to about 23.8 liters/m$^3$ (1.0 gal/bbl) wetting agent into the wellbore with the modified invert emulsion.

* * * * *

UNITED STATES PATENT AND TRADEMARK OFFICE
CERTIFICATE OF CORRECTION

| | | |
|---|---|---|
| PATENT NO. | : 7,803,743 B2 | Page 1 of 1 |
| APPLICATION NO. | : 11/444878 | |
| DATED | : September 28, 2010 | |
| INVENTOR(S) | : Thomas A. Jones, Alexander J. McKellar and Lirio Quintero | |

It is certified that error appears in the above-identified patent and that said Letters Patent is hereby corrected as shown below:

IN THE CLAIMS:
Col. 28, line 17, claim 50,
Please insert a --;-- after the word "pack".

Signed and Sealed this
Eighth Day of February, 2011

David J. Kappos
*Director of the United States Patent and Trademark Office*